(12) United States Patent
Ikeda et al.

(10) Patent No.: US 9,085,093 B2
(45) Date of Patent: Jul. 21, 2015

(54) SCREW SEGMENT

(75) Inventors: Sadao Ikeda, Toyota (JP); Takashi Nagase, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 781 days.

(21) Appl. No.: 13/384,503

(22) PCT Filed: Aug. 18, 2009

(86) PCT No.: PCT/JP2009/064443
§ 371 (c)(1),
(2), (4) Date: Jan. 17, 2012

(87) PCT Pub. No.: WO2011/021274
PCT Pub. Date: Feb. 24, 2011

(65) Prior Publication Data
US 2012/0125738 A1    May 24, 2012

(51) Int. Cl.
*B29C 47/06* (2006.01)
*B29B 7/48* (2006.01)
*B29C 47/08* (2006.01)
*B29C 47/38* (2006.01)
(Continued)

(52) U.S. Cl.
CPC ............. *B29B 7/481* (2013.01); *B29C 47/0004* (2013.01); *B29C 47/0871* (2013.01); *B29C 47/38* (2013.01); *B29C 47/402* (2013.01); *B29C 47/605* (2013.01); *B29C 47/6043* (2013.01); *B29C 47/6056* (2013.01); *B29C 47/6062* (2013.01); *B29C 47/6068* (2013.01); *B29C 47/6075* (2013.01); *B29C 47/625* (2013.01); *D21B 1/22* (2013.01); *B29C 47/0009* (2013.01); *B29K 2311/00* (2013.01); *B29K 2311/14* (2013.01); *B29K 2995/006* (2013.01); *Y02E 50/17* (2013.01)

(58) Field of Classification Search
CPC ................... B29C 47/6075; B29C 47/476043
USPC ...................................... 366/82, 85
See application file for complete search history.

(56) References Cited

U.S. PATENT DOCUMENTS 3,734,468 A * 5/1973 Cheng et al. ................. 366/300
3,999,921 A    12/1976 Thor et al.
(Continued)

FOREIGN PATENT DOCUMENTS

JP    50-146662 A    11/1975
JP    04-146281 A    5/1992
(Continued)

OTHER PUBLICATIONS

International Search Report of PCT/JP2009/064443 dated Dec. 1, 2009, PCT/ISA/201, 5 pages.

*Primary Examiner* — Tony G SooHoo
(74) *Attorney, Agent, or Firm* — Sughrue Mion, PLLC

(57) ABSTRACT

There are provided screw segments 100, 200 that are capable of shearing and kneading feedstock without causing plugs within a cylinder 1 of a screw extruder, and of extruding it from the cylinder 1. The screw segments 100, 200 each comprise a shaft part 111 to be affixed to a screw shaft 7, and a tooth part 112 that protrudes radially outward from the shaft part 111. The tooth part 112 comprises a tooth surface 116 that is formed on the front side relative to the rotation direction of the screw shaft 7, and that is so sloped as to transition gradually forward relative to the rotation direction as it transitions radially outward from the shaft part 111.

7 Claims, 26 Drawing Sheets

(51) Int. Cl.
B29C 47/40 (2006.01)
B29C 47/60 (2006.01)
D21B 1/22 (2006.01)
B29C 47/62 (2006.01)
B29C 47/00 (2006.01)
B29K 311/00 (2006.01)
B29K 311/14 (2006.01)

(56) References Cited

U.S. PATENT DOCUMENTS

| | | | | |
|---|---|---|---|---|
| 4,556,324 A | * | 12/1985 | Tynan | 366/85 |
| 4,871,259 A | * | 10/1989 | Harada et al. | 366/85 |
| 5,048,971 A | * | 9/1991 | Wall et al. | 366/85 |
| 5,100,240 A | * | 3/1992 | D'Alterio | 366/99 |
| 5,318,358 A | * | 6/1994 | Wobbe et al. | 366/85 |
| 5,539,004 A | | 7/1996 | Ikeda et al. | |
| 5,947,593 A | * | 9/1999 | Inoue et al. | 366/85 |
| 6,048,088 A | * | 4/2000 | Haring et al. | 366/85 |
| 6,136,246 A | | 10/2000 | Rauwendaal et al. | |
| 2005/0024986 A1 | * | 2/2005 | Mattingly, Jr. | 366/82 |
| 2005/0152214 A1 | | 7/2005 | Blach | |
| 2007/0177451 A1 | * | 8/2007 | Benjamin et al. | 366/82 |
| 2011/0007598 A1 | * | 1/2011 | Samann | 366/82 |

FOREIGN PATENT DOCUMENTS

| | | |
|---|---|---|
| JP | 6-84035 B2 | 10/1994 |
| JP | 06-285951 A | 10/1994 |
| JP | 09-276731 A | 10/1997 |
| JP | 2909577 B2 | 6/1999 |
| JP | 2001-522736 A | 11/2001 |
| JP | 2002-535177 A | 10/2002 |
| JP | 2006-506240 A | 2/2006 |

* cited by examiner

SCREW SEGMENT

CROSS REFERENCE TO RELATED APPLICATIONS

This application is a National Stage of International Application No. PCT/JP2009/064443 filed Aug. 18, 2009, the contents of all of which are incorporated herein by reference in their entirety.

TECHNICAL FIELD

The present invention relates to screw segments used in screw extruders.

BACKGROUND ART

Patent document 1 discloses an extruder in which wood-based biomass chips placed inside a cylinder are fed with a screw while being vapor heated.

Patent Document 2 discloses a screw extruder in which wood chips are placed inside a cylinder, fed while adding water, sheared under heat and pressure, and extruded from the cylinder after shearing, thereby decomposing lignin through bulking.

Cited Document 3 discloses a twin screw extruder that comprises twin screws equipped with kneading disks inside a heater barrel having a heater.
Patent Document 1: JP Patent Application Publication (Kokai) No. 2007-202518 A
Patent Document 2: JP Patent Application Publication (Kokai) No. 4-146281 A (1992)
Patent Document 3: JP Patent Application Publication (Kokai) No. 2004-58271 A

DISCLOSURE OF THE INVENTION

Problems to be Solved by the Invention

In the case of the technique disclosed in Patent Document 1, the screw is a screw feeder for feeding wood-based biomass chips, and is incapable of shearing and refining wood-based biomass. Accordingly, it is difficult to sufficiently decompose wood-based biomass chips within the cylinder.

In addition, due to the elution of decomposed matter, etc., adhesion occurs among the feedstock to form okoshi-like aggregates, thereby giving rise to the possibility that feeding within the cylinder may become difficult. Further, due to the fact that a screw feeder is used, and to the occurrence of the okoshi-like aggregates, a high filling rate within the cylinder cannot be ensured. Thus, in order to ensure greater throughput, the cylinder diameter and the cylinder length must be increased, both of which are problematic in that they cause an increase in device size.

Further, in the case of the technique disclosed in Patent Document 2, since a powder that is a non-fluid material is fed by rotating a screw body having a continuous and helical protruding part, the powder is moved outward due to centrifugal force, and a compression force and a friction force is locally and continuously applied. Thus, it quickly becomes highly densified and highly strengthened, potentially leading to occurrences of plugs (aggregates). Such occurrences of plugs are problematic in that due to the compression resistance, friction force, etc., that the plugs have, the rotation of the screw body is inhibited, causing overload (motor over torque), thereby making feeding impossible.

In addition, in the case of the technique disclosed in Patent Document 3, since a wood powder that is a non-fluid material is mixed with a plastic material that is a fluid material, fluidity may be ensured to some extent, and it may be extruded with a screw body.

However, when a feedstock comprising only a non-fluid material that is low in bulk density and has marked compressibility, e.g., cellulose-based chips, wood powder, etc., is fed and kneaded with a screw body and a kneading disk, it quickly becomes highly densified and highly strengthened due to compression regardless of the water content of the non-fluid material. Thus, plugs occur, and feeding malfunction (overload stall) occurs due to the compression resistance and friction force of the plugs. Accordingly, extruding such a feedstock comprising only a non-fluid material with a screw extruder through shearing and kneading is difficult.

The present invention is made in view of the problems mentioned above, and an object of the present invention is to provide screw segments that are capable of extruding a feedstock through shearing and kneading without causing plugs.

Means for Solving the Problems

A screw segment of the present invention that achieves the object above is a screw segment that is attachable to a screw shaft within a cylinder of a screw extruder so as to be rotatable therewith, the screw segment comprising: a shaft part that is to be affixed to the screw shaft; and a tooth part protruding radially outward from the shaft part. Further, the tooth part is characterized in that a tooth surface, which is formed on the front side relative to the rotation direction of the screw shaft, is so sloped as to gradually transition forward relative to the rotation direction as it transitions radially outward from the shaft part (claim 1).

With a screw segment of the present invention, since the tooth part comprises the tooth surface that is sloped forward relative to the rotation direction, it is possible to reduce the radially outward biasing force that acts on the feedstock due to the rotation of the screw segment. Thus, it is possible to prevent the feedstock from being moved outward within the cylinder due to centrifugal force, thereby causing compression force and friction force to be applied locally, and it is possible to perform shearing and kneading without causing plugs (aggregates).

A screw segment of the present invention is preferably configured such that the tooth surface is so sloped as to transition rearward relative to the rotation direction as it transitions from an upstream side within the cylinder relative to a feeding direction towards a downstream side (claim 2).

With a screw segment of the present invention, since the tooth surface is so sloped as to transition rearward relative to the rotation direction as it transitions from the upstream side of the cylinder relative to the feeding direction towards the downstream side, it is possible to bias the feedstock from the upstream side relative to the feeding direction towards the downstream side, and to reduce the radially outward biasing force.

Thus, it is possible to prevent the feedstock from being moved outward within the cylinder due to centrifugal force, thereby causing compression force and friction force to be applied locally, and it is possible to perform shearing and kneading without causing plugs (aggregates).

A screw segment of the present invention preferably has the tooth surface so formed that a tooth tip side of the tooth part is narrower than a tooth base side (claim 3).

With a screw segment of the present invention, since the tooth surface is so formed as to be narrower at the tooth tip of the tooth part than at the tooth base, it is possible to reduce the shearing force at the outermost part within a passage of the cylinder where the feedstock becomes high in density. Thus, it is possible to reduce the torque for rotating the screw shaft of the screw extruder, thereby enabling a reduction in the size of the driver motor.

A screw segment of the present invention is preferably such that the tooth part comprises a top surface that faces an inner wall surface of the cylinder, a front surface formed on an upstream side of the tooth part relative to the feeding direction, and a step part formed by cutting away an edge part between the top surface and the front surface to create a level difference (claim 4).

With a screw segment of the present invention, since the step part is formed at the edge part between the top surface and the front surface of the tooth part, it is possible to reduce the area of the tooth surface by an amount corresponding to the step part. Thus, it is possible to make the compression force and friction force generated when the feedstock that is fed from the upstream side relative to the feeding direction comes into contact with the tooth surface be relatively small.

Further, the step part is able to mitigate the compression force and friction force applied locally by the tooth part to the feedstock, and prevents the feedstock from quickly becoming highly densified and highly strengthened at the outermost part within the passage of the cylinder, thereby preventing the occurrence of plugs.

In addition, by providing the step part, the tooth surface becomes narrower at the tooth tip of the tooth part than at the tooth base. Thus, it is possible to make the thickness of the tooth part on the radially outward side be narrower than the thickness on the radially inner side. Thus, it is possible to reduce the shearing force at the outermost part within the passage of the cylinder where the feedstock becomes high in density. Thus, it is possible to reduce the torque for rotating the drive shaft of the screw extruder, thereby enabling a reduction in the size of the driver motor.

Effects of the Invention

With a screw segment of the present invention, since the tooth part has the tooth surface is sloped forward relative to the rotation direction, it is possible to reduce the radially outward biasing force that acts on the feedstock due to the rotation of the screw segment. Thus, it is possible to prevent the feedstock from being moved outward within the cylinder due to centrifugal force, thereby causing compression force and friction force to be applied locally, and it is possible to perform shearing and kneading without causing plugs (aggregates).

LIST OF REFERENCE NUMERALS

1 . . . cylinder, 1a . . . passage, 2 . . . feed port, 3 . . . discharge port, 4 . . . decomposing agent supplying part, 4a . . . first supplying part, 4b . . . second supplying part, 5 . . . refrigerant supplying part, 6 . . . enzyme supplying part, 11 . . . coarse grinding zone, 12 . . . hot compressed water treatment zone, 12A . . . upstream zone, 12B . . . downstream zone, 13 . . . cooling zone, 14 . . . saccharization preparation zone, 15 . . . discharge zone, 21-25 . . . screw array, 31-35 . . . resistor, 50 . . . forward full flight, 52 . . . reverse full flight, 43 . . . forward double-threaded screw kneading disk, 54 . . . reverse double-threaded screw kneading disk, 45 . . . perpendicular double-threaded screw kneading disk, 100 . . . special gear kneader, 200 . . . special fluffer ring, 300 . . . special seal ring,

BEST MODES FOR CARRYING OUT THE INVENTION

Embodiments of the present invention are described below with reference to the drawings. It is noted that, in each of the embodiments below, although a description is provided taking as an example a case where the feedstock is plant biomass, the feedstock is by no means limited to plant biomass, and application is also possible in cases where other feedstocks are processed.

EMBODIMENTS

Embodiment 1

Figure 1:
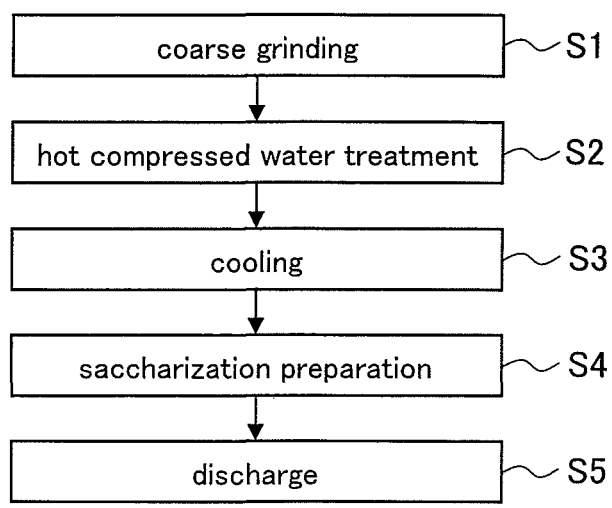
FIG. 1 is a flowchart illustrating a preprocessing method for a plant biomass feedstock.
Figure 2:
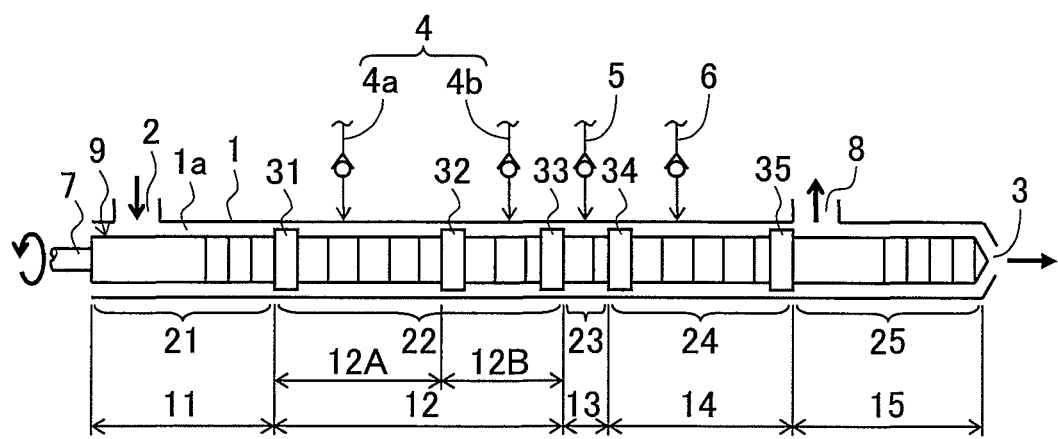
FIG. 2 is a diagram schematically showing a configuration of a cylinder and screw array of a screw extruder.

FIG. 1 is a flowchart illustrating a preprocessing method for a plant biomass feedstock with respect to the present embodiment. FIG. 2 is a diagram schematically showing a configuration of a cylinder and screw array of a screw extruder.

As shown in FIG. 1, a preprocessing method for a plant biomass feedstock with respect to the present embodiment comprises: a coarse grinding step S1; a hot compressed water treatment step S2; a cooling step S3; a saccharization preparation step S4; and a discharge step S5. These steps are performed sequentially and successively within a cylinder 1 of the screw extruder shown in FIG. 2.

For the screw extruder of the present embodiment, a co-rotating twin screw extruder in which two screw arrays provided in parallel rotate in the same direction is used, and it comprises the cylinder 1 having a passage 1a that extends linearly.

With respect to the cylinder 1, a feed port 2 through which plant biomass (a non-fluid material), e.g., wood chips, etc., is fed is formed at one end part of the passage 1a, and a discharge port 3 through which plant biomass feedstock that has been preprocessed within the passage 1a is discharged is formed at the other end part of the passage 1a.

Two screw shafts 7, which are linked to a drive motor not shown in the diagram, are disposed in parallel to form a pair within the passage 1a of the cylinder 1. Screw arrays 9 are configured by appropriately combining and attaching, in series, various screw segments, e.g., full flighted screws 50, 52, kneading disks 54, 56, 58, etc., to the pair of screw shafts 7.

The screw arrays 9 form a feed means comprising: a plurality of feed parts that integrally rotate within the passage 1a by way of the rotation of the screw shafts 7 by the drive motor, and that feed the feedstock towards the discharge port 3 by way of that rotation; a shear/knead part that shears and kneads the feedstock; and a resistor that imparts feeding resistance to the feedstock.

Within the passage 1a of the cylinder 1, there are configured, in series: a coarse grinding zone 11; a hot compressed water treatment zone 12; a cooling zone 13; a saccharization preparation zone 14; and a discharge zone 15. The hot compressed water treatment zone 12 is formed between resistors 31, 33 provided apart from each other on the upstream side and the downstream side of the passage 1a relative to the feeding direction. In the present embodiment, resistors 31, 32, 33 are respectively provided at an upstream part, a middle part, and a downstream part of the hot compressed water treatment zone 12, and an upstream zone 12A and a downstream zone 12B are thus formed.

The cylinder 1 is provided with: a decomposing agent supplying part 4 that supplies a decomposing agent to the hot compressed water treatment zone 12; a refrigerant supplying part 5 that supplies a refrigerant to the cooling zone 13; and an enzyme supplying part 6 that supplies an enzyme to the saccharization preparation zone 14.

A plurality of the decomposing agent supplying parts 4 are provided at predetermined intervals in the longitudinal direction of the passage 1a. In the present embodiment, a first supplying part 4a is provided in the upstream zone 12A, and a second supplying part 4b is provided in the downstream zone 12B. The relationship between supply rates for the decomposing agent per unit time is defined by the relationship (first supplying part 4a> second supplying part 4b). For the decomposing agent, by way of example, water, e.g., cold water, hot water, etc., an acid, an alkali, a solvent, a decay fungus, a supercritical liquid, etc., is used, and is added to the plant biomass feedstock by being supplied into the passage 1a from the decomposing agent supplying parts 4.

It is noted that the decomposing agent supplying parts 4 may also be provided in the coarse grinding zone 11 to supply a decomposing agent to the coarse grinding zone 11. By way of example, by supplying a decomposing agent, e.g., an acid, a decay fungus, etc., to the coarse grinding zone 11, the decomposing agent may be added at the same time as the grinding of the plant biomass feedstock, thereby increasing efficiency.

In order to bring the plant biomass feedstock, which has been brought to a high temperature at the hot compressed water treatment zone 12, to a temperature that is optimal for the activity of the enzyme, the refrigerant supplying part 5 supplies a refrigerant, e.g., liquid nitrogen, etc., to the cooling zone 13 for cooling. The enzyme supplying part 6 supplies the enzyme to the plant biomass feedstock. The enzyme is mixed with the plant biomass feedstock at the saccharization preparation zone. With respect to the refrigerant supplying part 5 and the enzyme supplying part 6, there may also be provided a plurality of each of them at predetermined intervals in the longitudinal direction within the passage 1a.

A heater not shown in the drawings is provided with respect to the cylinder 1, thereby making it possible to maintain a high temperature state by heating the plant biomass feedstock at the hot compressed water treatment zone 12. An appropriate amount of the plant biomass with respect to time is fed into the passage 1a from the feed port 2. In the present embodiment, by way of example, wood-based biomass, e.g., wood chips, etc., is used.

Each of steps S1 through S5 is described in detail below.

In coarse grinding step S1, through shearing, friction, dispersion, diffusion and kneading caused by the rotation of the screw arrays 9, the plant biomass feedstock in the form of chips is mechanically ground and turned into small coarsely ground bodies of or below a pre-defined size. Then, the plant biomass feedstock that has been turned into coarsely ground bodies is fed from the coarse grinding zone 11 to the hot compressed water treatment zone 12 downstream.

A screw array 21 in the coarse grinding zone 11 is configured by combining, as deemed appropriate, by way of example, a forward full flight 50, a forward double-threaded screw kneading disk 54, a reverse double-threaded screw kneading disk 56, and a perpendicular double-threaded screw kneading disk 58. Further, at least one of a special gear kneader 100 and a special fluffer ring 200 is disposed at a highly-filled zone formed within the coarse grinding zone 11 where the filling rate for the plant biomass feedstock is high, and at a feeding zone for feeding the plant biomass feedstock to the hot compressed water treatment zone 12 downstream.

The special gear kneader 100 and the special fluffer ring 200, which are screw segments of the present invention, are capable of facilitating the shearing, coarse grinding, kneading, dispersing, and decomposition of the plant biomass feedstock by disrupting the flow of the plant biomass feedstock within the passage 1*a*. Further, feeding to the downstream side may also be enhanced and stabilized, thereby preventing the occurrence of plugs. It is noted that the plant biomass feedstock is at room temperature at the coarse grinding zone.

At the hot compressed water treatment zone 12, a decomposing agent, e.g., water, etc., is supplied into the passage 1*a* via the first supplying part 4*a* and the second supplying part 4*b*, and is thus added to the plant biomass feedstock. Then, through the rotation of a screw array 22, a hot compressed water treatment for the plant biomass feedstock is performed. In the hot compressed water treatment, the plant biomass feedstock is refined, kneaded, stirred, dispersed, and decomposed by the screw array 22 under hot compressed water.

The screw array 22 in the hot compressed water treatment zone 12 comprises the resistors 31, 32 and 33 for suppressing the feeding of the plant biomass feedstock at the furthest upstream part, the furthest downstream part and the middle part, respectively, of the hot compressed water treatment zone 12, and thus forms highly-filled zones upstream of the resistors 31 to 33 where the filling rates for the plant biomass feedstock are high.

The hot compressed water treatment zone 12 has its sealing characteristics enhanced by these resistors 31 to 33, and the pressure at the hot compressed water treatment zone 12 is maintained in a high-pressure state at or above saturated vapor pressure (e.g., 1 to 30 MPa).

The resistors 31 and 33 each comprise a special seal ring 300. The gap between the special seal ring 300 and the inner wall surface of the cylinder passage 1*a* is sealed with the plant biomass feedstock to create a sealed state, thereby raising the pressure within the hot compressed water treatment zone 12.

At the hot compressed water treatment zone 12, via heating by the heater and the shear friction heat caused by the screw array 9, it is possible to maintain the temperature of the plant biomass feedstock with respect to the hot compressed water treatment zone 12 at 130° C. to 350° C.

It is thus possible to place the hot compressed water treatment zone 12 under hot compressed water (high pressure and high temperature), and to have a hydrothermal treatment performed, where the plant biomass feedstock to which the decomposing agent has been added is made to swell and is softened. It is thus possible to finely grind the hydrothermally treated plant biomass feedstock with ease by way of shearing and kneading by the screw array 22.

It is noted that when a decay fungus is added as the decomposing agent, the temperature is maintained between room temperature and 80° C. In addition, if supercritical water is added as the decomposing agent, the pressure at the hot compressed water treatment zone 12 is held at or above supercritical pressure.

The screw array 22 is configured by combining, as deemed appropriate, the special seal ring 300, the special gear kneader 100, the special fluffer ring 200, the forward full flight 50, the reverse full flight 52, the forward double-threaded screw kneading disk 54, the reverse double-threaded screw kneading disk 56, the perpendicular double-threaded screw kneading disk 58, etc.

The hot compressed water treatment zone 12 is divided into the upstream zone 12A and the downstream zone 12B by the resistor 32 of the middle part. The screw design of the screw array 22 is such that at least one of the special gear kneader 100 and the special fluffer ring 200, which are screw segments of the present invention, is disposed at each of the highly-filled zones formed by the resistors 31 to 33, the feeding zone for feeding the plant biomass feedstock from the upstream zone 12A to the downstream zone 12B, and the feeding zone for feeding the plant biomass from the downstream zone 12B to the cooling zone 13.

By disposing the special gear kneader 100, etc., at the highly-filled zones, the refining, kneading, stirring, dispersing, and decomposing of the plant biomass feedstock may be expedited. In addition, by disposing the special gear kneader 100, etc., at the feeding zones, compression force and friction force are prevented from being applied locally to the plant biomass feedstock, thereby preventing the occurrence of plugs.

Each of the resistors 31 to 33 of the screw array 22 is configured by a combination of the special seal ring 300, the reverse full flight 32, the special gear kneader 100, and the special fluffier ring 200. The relationship among the respective resistances of the resistors 31 to 33 is defined by the relationship (resistor 31 of the furthest upstream part< resistor 32 of the middle part< resistor 33 of the furthest downstream part) such that the resistance becomes greater the further downstream it is.

At the hot compressed water treatment zone 12, the refining, kneading and decomposition of the plant biomass feedstock progresses as it moves further downstream, and its shear resistance, knead/diffusion resistance and fluid resistance drop. Accordingly, by reducing the gap relative to the inner wall surface of the passage 1*a* in accordance with how far downstream it is, a flow and a filling rate that are appropriate are ensured at each of the upstream zone 12A and the downstream zone 12B, and diffusibility and dispersibility with respect to the decomposing agent are ensured, while making decomposition more efficient.

In addition, since the resistors 31 to 33 are disposed at the upstream part, the middle part and the downstream part along the flow direction, it is possible to have the plant biomass feedstock repeatedly undergo compression and expansion, thereby making the various treatments more efficient.

The first supplying part 4*a* is disposed in the upstream zone 12A on the upstream-side thereof, and the second supplying part 4*b* is disposed in the downstream zone 12B on the upstream-side thereof. Thus, with respect to each zone, the distance over which the hydrothermal treatment is performed may be so secured as to be as long as possible, thereby allowing the hydrothermal treatment to be performed effectively. With respect to the amount of decomposing agent supplied, by way of example, if the decomposing agent is water, its ratio with respect to the plant biomass feedstock would be set within the range of from 0.25 to 3, and if the decomposing agent is an acid, an alkali or a solvent, its ratio with respect to the plant biomass feedstock would be set within the range of from 0.01 to 1.

Since the hot compressed water treatment zone 12 is held at a high pressure and high temperature by means of the special seal ring 300, it is possible to efficiently perform the hydrothermal treatment, which softens the plant biomass feedstock. Thus, the plant biomass feedstock is finely ground by the shearing, kneading, dispersing and decomposing actions of the screw array 22, and becomes finer than the plant biomass feedstock in the coarse grinding zone 11. In order to perform the hydrothermal treatment efficiently, the same number of first supplying parts 4a and second supplying parts 4b as the highly-filled zones formed within the hot compressed water treatment zone 12 are provided.

The decomposing agent supplying parts 4 may also have their supplying positions designed in accordance with the conditions in the hot compressed water treatment zone 12, such as pressure, temperature, etc. By supplying the decomposing agent at appropriate positions, the refining, kneading, stirring, dispersion and decomposition of the plant biomass feedstock may be expedited, thereby preventing any excessive supplying of the processing agent. The plant biomass feedstock processed at the hot compressed water treatment zone 12 is fed to the cooling zone 13 located downstream.

In cooling step S3, a refrigerant, e.g., liquid nitrogen, etc., is supplied into the passage 1a from the refrigerant supplying part 5, and a process of cooling the plant biomass feedstock in the cooling zone 13 is performed. A screw array 23 is configured by combining only screw segments that have a feeding function, e.g., the forward full flight 50, etc.

Since the plant biomass is brought to a high temperature at the hot compressed water treatment zone 12, its temperature is high immediately after being fed from the hot compressed water treatment zone 12, and is not at a temperature that is favorable for enzymes. Thus, if an enzyme were to be added in saccharization preparation step S4 under such temperature conditions, there is a risk that saccharization by the enzyme may become difficult. Accordingly, cooling step S3 is provided between hot compressed water treatment step S2 and saccharization preparation step S4, thereby cooling the plant biomass feedstock that has been brought to a high temperature down to an appropriate temperature so that saccharization by the enzyme would take place appropriately. It is noted that the plant biomass feedstock in the cooling zone 13 is cooled to a temperature of 40° C. to 50° C. by the refrigerant.

In saccharization preparation step S4, a process is performed where an enzyme is supplied into the passage 1a from the enzyme supplying part 6, and the enzyme is mixed with the plant biomass feedstock in the saccharization preparation zone 14.

A screw array 24 in the saccharization preparation zone 14 is configured by combining, as deemed appropriate, by way of example, the special seal ring 300, the special gear kneader 100, the special fluffer ring 200, the forward full flight 50, the reverse full flight 52, the forward double-threaded screw kneading disk 54, the reverse double-threaded screw kneading disk 56, the perpendicular double-threaded screw kneading disk 58, etc. A predetermined amount of enzyme liquid is supplied into the passage 1a from the enzyme supplying part 6, and is thus added to the plant biomass feedstock within the saccharization preparation zone 14 (e.g., 40 FPU).

By the time the process reaches saccharization preparation step S4, the plant biomass feedstock becomes high in viscosity, and there is a possibility that, by way of example, an operator, etc., would be unable to sufficiently mix it. However, since mixing is performed by the screw array 24 in the saccharization preparation zone 14, it is possible to sufficiently mix the enzyme with the plant biomass feedstock. Once mixed with the enzyme in the saccharization preparation zone 14, the plant biomass feedstock is fed to the discharge zone 15 located downstream.

In discharge step S5, a process is performed where the plant biomass that has been mixed with the enzyme in the saccharization preparation zone 14 is discharged as a preprocessed feedstock, while a process is performed where gas components are degassed from the plant biomass feedstock that has undergone saccharization preparation. The cylinder 1 is provided with a vent 8 for degassing. The vent 8 places the discharge zone 15 of the passage 1a in communication with the outside, thereby making it possible to discharge a portion of the gas components within the discharge zone 15.

By discharging a portion of the gas components through the vent 8, the water content of the decomposing agent in the plant biomass feedstock may be adjusted appropriately. Further, by removing unwanted gas components, it is possible to supply plant biomass feedstock that is in an optimal state for the ensuing saccharization step, etc. The plant biomass feedstock discharged through the discharge port 3 is turned into ethanol via steps similar to conventional steps (saccharization, fermentation, distillation).

A screw array 25 in the discharge zone 15 is configured by combining, as deemed appropriate, by way of example, various screw segments, e.g., the forward double-threaded screw kneading disk 54, the reverse double-threaded screw kneading disk 56, the perpendicular double-threaded screw kneading disk 58, etc. Further it is configured such that at least one of the special gear kneader 100 and the special fluffer ring 200 is disposed in a downstream zone for discharging the plant biomass feedstock through the discharge port 3.

With the preprocessing method for plant biomass mentioned above, preprocessing including coarsely grinding plant biomass to or below a predefined size, adding a decomposing agent, performing hot compressed water treatment, and saccharization preparation in which it is mixed with an enzyme, is performed sequentially and successively within an extruder. Thus, the various processes of coarse grinding, hot compressed water treatment and saccharization preparation, which had conventionally been performed separately and independently, may be performed coherently. Thus, preprocessing may be performed efficiently, and equipment costs may be reduced through equipment simplification, thereby achieving lower costs.

[Screw Shape]

Various screw segments forming the screw array 9 in the present embodiment are described below.

Figure 3:
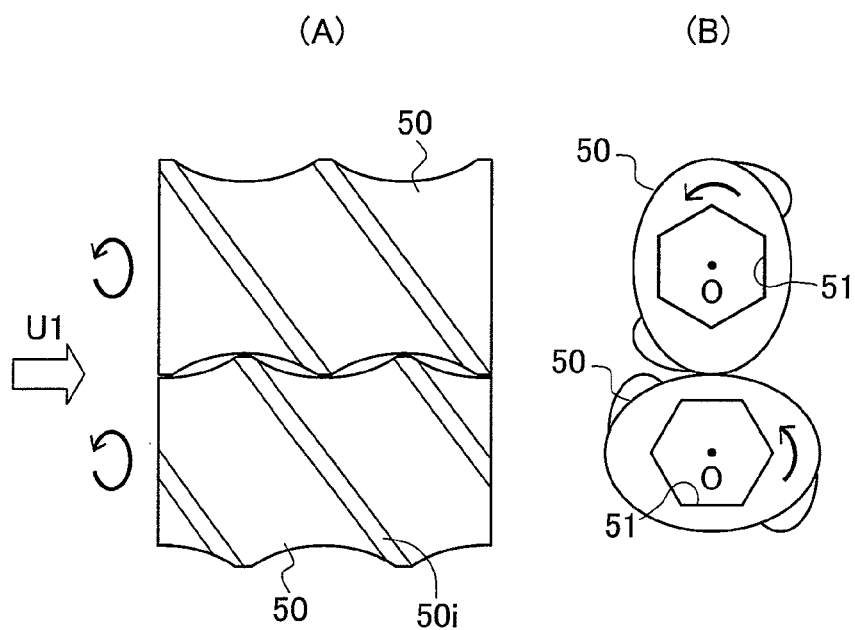
FIG. 3 is a diagram showing a configuration of a forward full flight.
Figure 4:
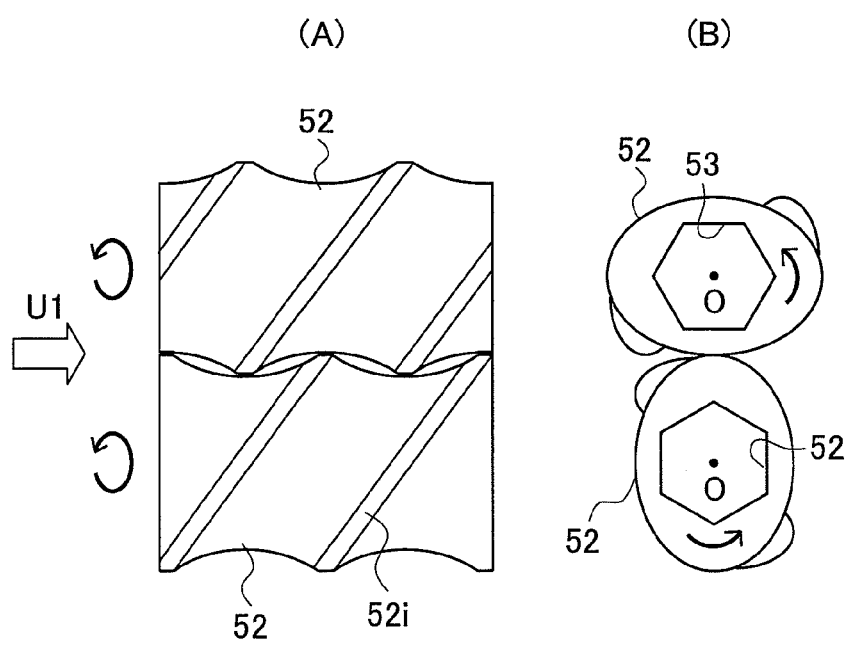
FIG. 4 is a diagram showing a configuration of a reverse full flight.

FIGS. 3(A) and (B) are diagrams showing an example of a forward full flight. FIGS. 4(A) and (B) are diagrams showing an example of a reverse full flight. It is noted that the generally circular inner wall surface of the passage 1a of the cylinder 1 is omitted in FIG. 3(B) and in FIG. 4(B).

The forward full flight 50 has the torsion direction of a screw 50i designed so as to ensure a downstream feeding capability. The reverse full flight 52 has the torsion direction of a screw 52i designed so as to lower the downstream feeding capability.

Figure 5:
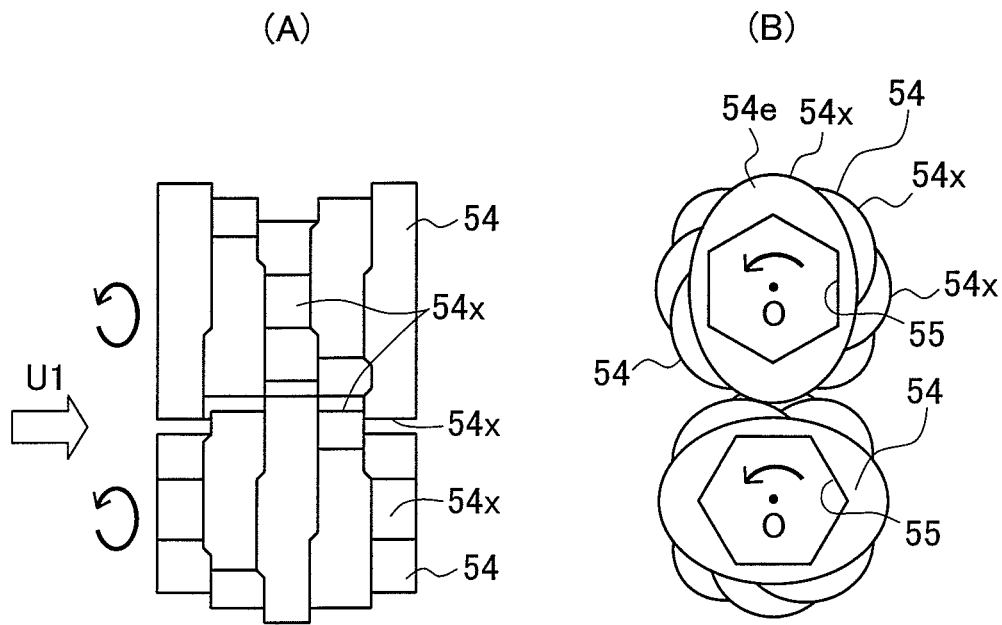
FIG. 5 is a diagram showing a configuration of forward double-threaded screw kneading disks.

An example of the forward double-threaded screw kneading disk 54 is shown in FIGS. 5(A) and (B). The forward double-threaded screw kneading disk 54 comprises generally oval paddles 54e having apices 54x, wherein they are configured in series with the apices 54x oriented right-down.

Figure 6:
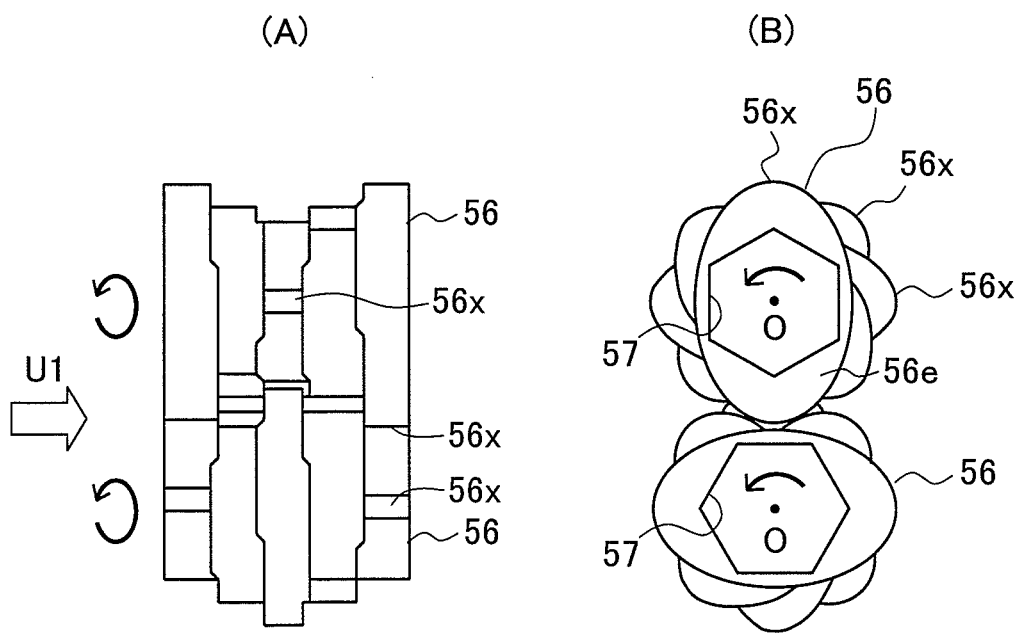
FIG. 6 is a diagram showing a configuration of reverse double-threaded screw kneading disks.

An example of the reverse double-threaded screw kneading disk 56 is shown in FIGS. 6(A) and (B). The reverse double-threaded screw kneading disk 56 comprises generally oval paddles 56e having apices 56x, wherein they are configured in series with the apices 56x oriented right-up.

Figure 7:
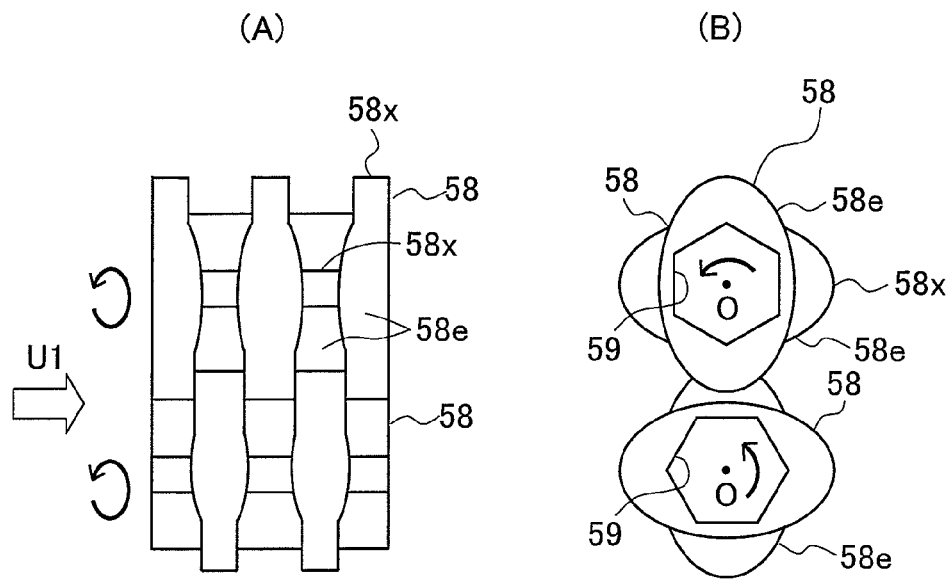
FIG. 7 is a diagram showing a configuration of perpendicular double-threaded screw kneading disks.

FIGS. 7(A) and (B) are diagrams showing an example of the perpendicular double-threaded screw kneading disk 58. The perpendicular double-threaded screw kneading disk 28 is such that generally oval paddles 58e having apices 58x are configured in series with a tilt angle of 90°. As the perpendicular double-threaded screw kneading disk 58 has no helix angle, it has almost no feeding capability, but it has a high shearing capability, and is high in dispersion capability and kneading capability.

In the forward full flight 50, the reverse full flight 52, the forward double-threaded screw kneading disk 54, the reverse double-threaded screw kneading disk 56 and the perpendicular double-threaded screw kneading disk 58 are respectively provided through-holes 51, 53, 55, 57, 59 along their center axes for inserting and securing the screw shaft 7.

Figure 8:
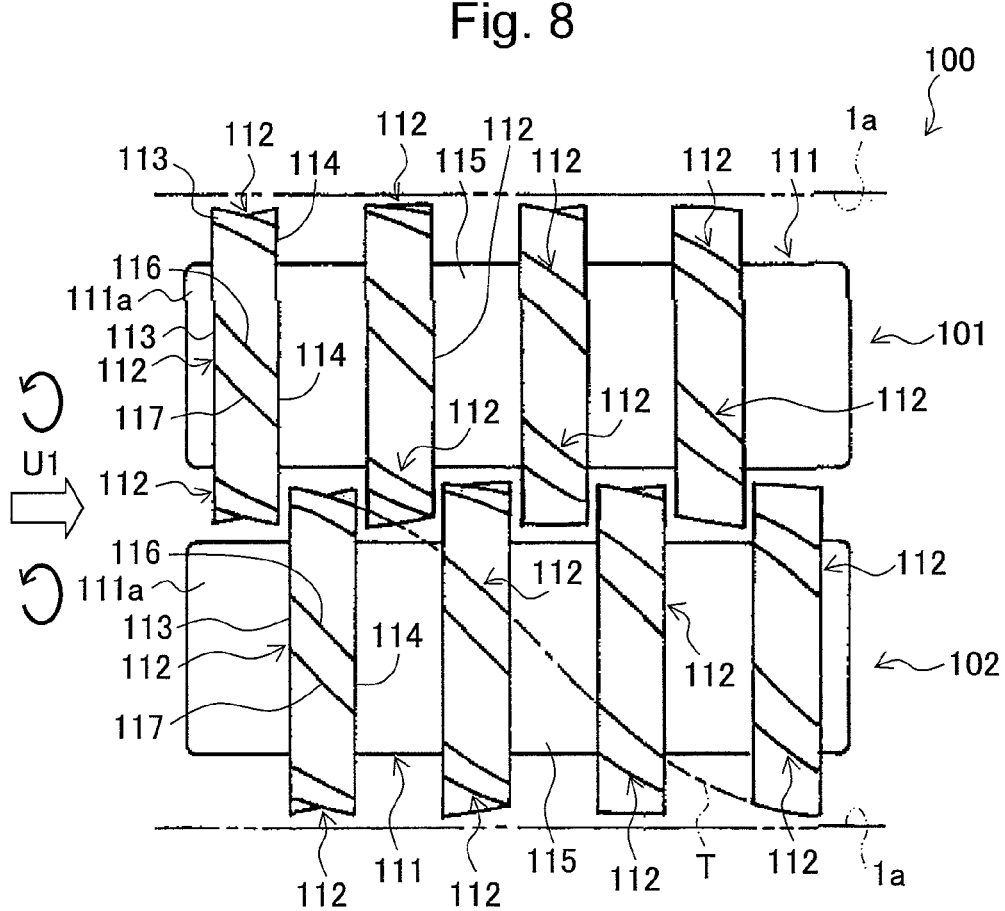
FIG. 8 is a diagram showing a configuration of a special gear kneader.
Figure 9:
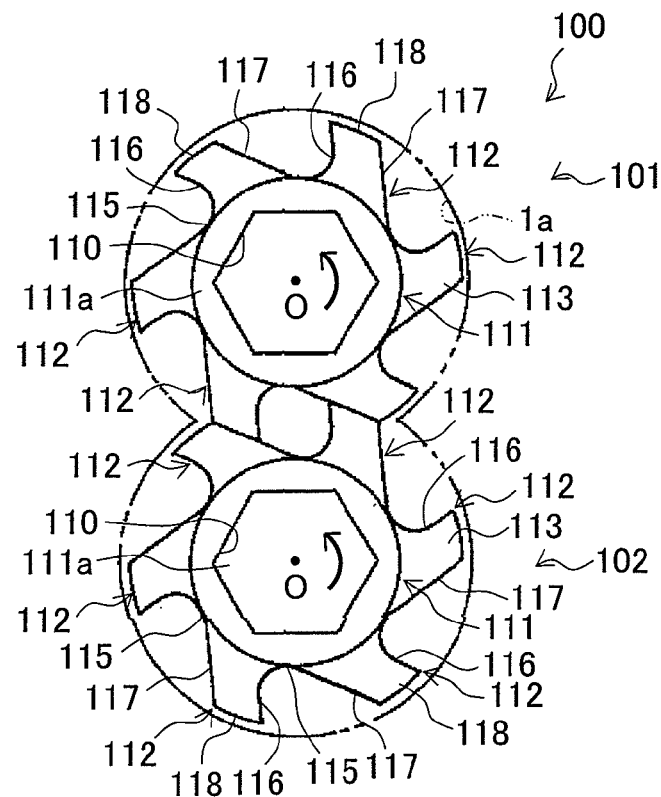
FIG. 9 is a view of FIG. 8 as observed in the direction of arrow U1.
Figure 10:
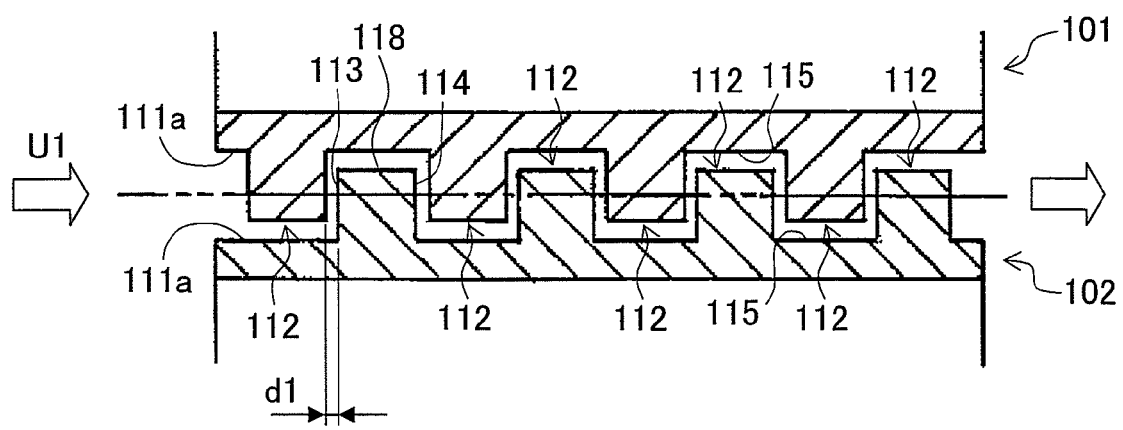
FIG. 10 is a schematic diagram showing, in a cross section, a gear intermeshing state of the special gear kneader in FIG. 8.
Figure 11:
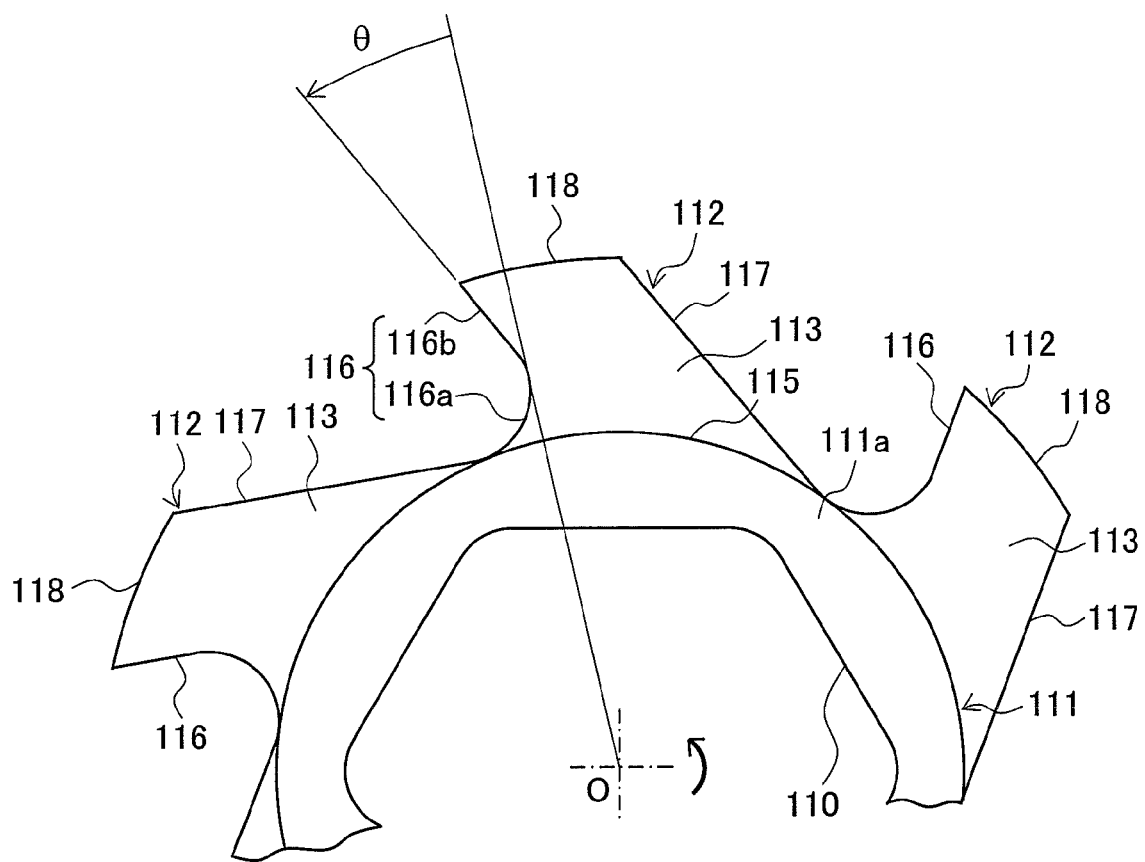
FIG. 11 is an enlarged view of some of the tooth parts shown in FIG. 9.

Next, a configuration of a special gear kneader, which is a screw segment of the present invention, is described. FIG. 8 is a diagram showing an example of a configuration of a special gear kneader. FIG. 9 is a view of the special gear kneader shown in FIG. 8 as observed in the direction of arrow U1, which is the feeding direction for the plant biomass feedstock. FIG. 10 is a schematic diagram showing a gear intermeshing state of the special gear kneader in FIG. 8 by way of a cross-section. FIG. 11 is an enlarged view of some of the tooth parts shown in FIG. 9.

As shown in FIG. 8 or FIG. 9, the special gear kneader 100 comprises a first rotating body 101 and a second rotating body 102. The first rotating body 101 and the second rotating body 102 are each configured to have a plurality of tooth parts 112 on a cylindrical shaft part 111.

As shown in FIG. 9, a hexagonal through-hole 110 is provided in the shaft part 111 along the center axis of the shaft part 111. The special gear kneader 100 is adapted to be capable of rotating with the screw shafts 7 by inserting and securing the screw shafts 7 in the through-holes 110.

As shown in FIG. 9, the plurality of tooth parts 112 are provided in a protruding manner at predetermined intervals along the circumferential direction of the shaft part 111. In the present embodiment, six tooth parts 112 are disposed at regular intervals. The number of tooth parts 112 is by no means limited to that of the present embodiment and need only be one or more.

In addition, as shown in FIG. 8, the plurality of tooth parts 112 are provided at predetermined intervals along feeding direction U1, which is the lengthwise direction of the shaft part 111. In the present embodiment, counting the six tooth parts 112 that are consecutive in the circumferential direction of the shaft as one tooth part group, they are so disposed as to form a total of four tooth part groups in feeding direction U1. The number of tooth part groups is likewise by no means limited to that of the present embodiment and need only be plural.

The tooth parts 112 have a certain thickness in the lengthwise direction of the shaft part 111. On their upstream side relative to the feeding direction, which is the front side relative to the lengthwise direction of the shaft, a front surface 113 parallel to the radial direction of the shaft part 111 is formed. On their downstream side relative to the feeding direction, which is the rear side relative to the lengthwise direction of the shaft, a rear surface 114 parallel to the radial direction of the first shaft part 111 is formed.

In addition, as shown in FIG. 9, the tooth parts 112 each comprise tooth surfaces 116, 117 that extend radially outward from a shaft cylinder outer circumferential surface 115 of the shaft part 111 and are parallel to the lengthwise direction of the shaft, and a top surface 118 that is continuous between the upper end parts of the tooth surfaces 116, 117.

As shown in FIG. 8, the tooth surfaces 116, 117 are so sloped as to transition rearward relative to the rotation direction as they transition downstream relative to the feeding direction, and thus have a predetermined helix angle (lead). When the tooth surfaces 116, 117 of the plurality of tooth parts 112 consecutive in the lengthwise direction of the shaft at predetermined intervals are connected in the lengthwise direction of the shaft, the helical lead indicated with phantom line T in FIG. 8 is obtained. As the first rotating body 101 or the second rotating body 102 rotates in the direction of the arrow, feedability of the plant biomass feedstock in the direction of arrow U1 is ensured by virtue of the helix angles of the tooth surfaces 116, 117 of the tooth parts 112.

Of the pair of tooth surfaces 116, 117, the tooth surface 116, which is located on the front side relative to the rotation direction of the first rotating body 101 or second rotating body 102, comprises, as shown in FIG. 11, a curved surface part 116a with a recessed arc-like cross-section and that smoothly rises radially outward from the shaft cylinder outer circumferential surface 115, and a flat vertical wall surface part 116b that is continuous with the curved surface part 116a, extends radially outward, which is in a direction away from the shaft part 111, and slopes forward in the rotation direction at gradient angle θ so as to transition forward relative to the rotation direction as it transitions radially outward.

On the other hand, the tooth surface 117, which is located on the rear side relative to the rotation direction, has a flat shape that extends radially outward from the shaft cylinder outer circumferential surface 115, and slopes so as to transition forward relative to the rotation direction as it transitions radially outward. In the present embodiment, it is so formed as to be parallel to the vertical wall surface part 116b of the tooth surface 116.

The top surface 118 has an arc shape who takes shaft center O of the shaft part 111 as its center. As shown in FIG. 9, it is so formed as to face the inner wall surface of the passage 1a, which is in the shape of a true circle, with a predetermined gap therebetween.

As shown in FIG. 8, the first rotating body 101 and the second rotating body 102 are so disposed in parallel that the tooth parts 112, which are disposed at predetermined intervals in the lengthwise direction of the shaft, of one of the shaft parts 111 would be located between the tooth parts 112 of the other shaft part 111. Thus, the tooth parts 112 of the first rotating body 101 and the tooth parts 112 of the second rotating body 102 are alternately arranged in the lengthwise direction of the shaft. As shown in FIG. 10, angular U-shaped and angular inverted-U-shaped gaps are formed between the first rotating body 101 and the second rotating body 102 so as to be continuous in the direction of arrow U1, which is the feeding direction. The kneading capability and dispersing capability of the special gear kneader 100 are thus ensured. Further, predetermined gap d1 is formed between the rear surface 114 of the tooth part 112 located on the upstream side relative to the feeding direction and the front surface 113 of the tooth part 112 that partially faces that rear surface 114 and that is located on the downstream side relative to the feeding direction.

By narrowing gap d1, the resistance with respect to the feeding of the plant biomass feedstock increases, thus allowing it to be made to function as a resistor that suppresses the feeding of the plant biomass feedstock. Accordingly, it is also preferable that the gear kneader 100 be disposed at a location in the hot compressed water treatment zone 12 of the cylinder 1 where a highly-filled zone is to be formed.

The respective shaft parts 111 of the first rotating body 101 and second rotating body 102 each comprise a boss part 111a which protrudes further in the lengthwise direction of the shaft than the tooth parts 112 located foremost on the upstream side relative to the feeding direction. The boss part 111a prevents the plant biomass feedstock that is fed from the upstream side relative to the feeding direction from colliding with the front surfaces 113 of the tooth parts 112 located foremost with its flow speed maintained, thereby preventing an abrupt compression force and friction force from being applied to those tooth parts 112 locally, and reducing the torque fluctuation experienced by the motor that rotationally drives the screw shaft.

Further, as shown in FIG. 9 for example, the first rotating body 101 and the second rotating body 102 have their rotation timings so set that the tooth parts 112 of one shaft part 111 and the tooth parts 112 of the other shaft part 111 approach and pass by one another halfway between the first rotating body 101 and the second rotating body 102.

With the special gear kneader 100 having the configuration mentioned above, since the tooth surface 116 formed on the front side of the tooth part 112 relative to the rotation direction comprises the vertical wall surface part 116b that is sloped at gradient angle θ towards the front side relative to the rotation direction, it is possible to reduce the radially outward biasing force that acts on the plant biomass feedstock due to the rotation of the first rotating body 101 and second rotating body 102. Thus, it is possible to prevent the plant biomass feedstock from being moved outward within the passage 1a of the cylinder 1 due to centrifugal force to cause compression force and friction force to be applied locally, and it is possible to prevent the occurrence of plugs (aggregates).

Figure 38:
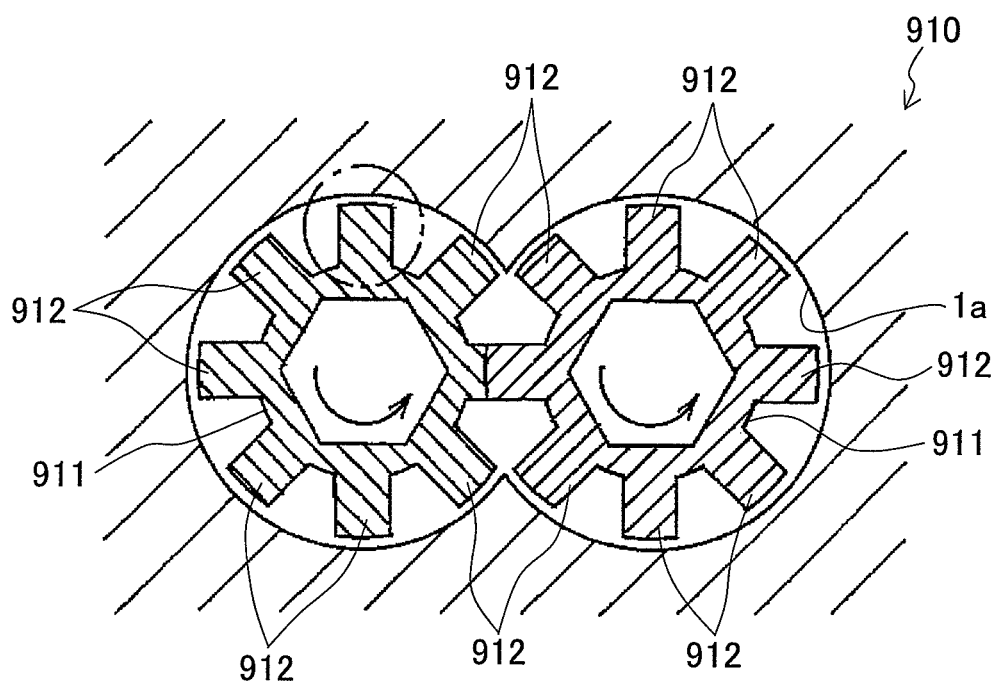
FIG. 38 is a schematic diagram of gear kneader that a conventional twin screw extruder has.
Figure 39:
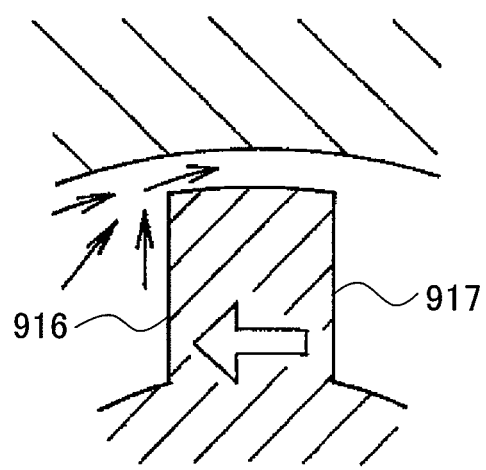
FIG. 39 is an enlarged view of a key portion in FIG. 38.

FIG. 38 is a schematic diagram of a gear kneader 910 that a known twin screw extruder has. FIG. 39 is an enlarged view of a key portion in FIG. 38. Tooth parts 912 of the conventional gear kneader 910 protrude radially from shaft parts 911 as shown in FIG. 38 and FIG. 39. Of a pair of tooth surfaces 916, 917, the tooth surface 916 located on the front side relative to the rotation direction has a flat shape that transitions rearward relative to the rotation direction as it transitions radially outward.

Thus, a non-fluid material, e.g., wood powder, etc., is pushed radially outward relative to a first rotating body 901 and a second rotating body 902 due to centrifugal force, and compression force and friction force are locally applied as indicated with the thin arrows in FIG. 39, thereby quickly causing highly densified and highly strengthened plugs at the outermost part within the passage 1a. Further, due to the compression resistance, friction force, etc., of such plugs, there is a possibility that the rotation of the first rotating body 901 and the second rotating body 902 may be impeded, causing an overload (motor over torque), and making feeding difficult.

In contrast, with respect to the special gear kneader 100 of the present invention, as shown in FIG. 11 in particular, the tooth surface 116 located on the front side of the tooth part 112 relative to the rotation direction comprises the vertical wall surface part 116b that is sloped at gradient angle θ towards the front side relative to the rotation direction. Accordingly, the radially outward biasing force that acts on the plant biomass feedstock may be reduced, and the occurrence of plugs within the passage 1a of the cylinder 1 may be prevented effectively. Further, by preventing the occurrence of plugs, the screw shafts 7 are prevented from deforming in the radial direction of the shaft, and the occurrence of wear and overload due to contact between the tooth parts 112 and the passage 1a of the cylinder 1 may be prevented.

In addition, in shearing the plant biomass feedstock by moving the tooth parts 112 that are adjacent in the lengthwise direction of the shaft in mutually opposing directions by way of the rotation of the first rotating body 101 and the second rotating body 102, since shearing may be performed with the vertical wall surface parts 116b that are sloped at gradient angle θ towards the front side relative to the rotation direction, the force required to shear the plant biomass feedstock may be reduced. Thus, the driving force for the extruder may be reduced, thereby enabling a reduction in the size of the drive motor.

In addition, as indicated with phantom line T in FIG. 8, since the tooth surfaces 116 of the tooth parts 112 have a predetermined helix angle with respect to the lengthwise direction of the shaft, the plant biomass feedstock may be biased so as to travel from the upstream side relative to the feeding direction towards the downstream side, thereby reducing the radially outward biasing force, and it is thus possible to prevent it from being highly compressed at the outermost part within the passage 1a of the cylinder 1.

It is noted that, with respect to the special gear kneader 100 discussed above, a description has been provided taking as an example a case where the plurality of tooth parts 112 disposed at predetermined intervals in the lengthwise direction of the shaft all have a uniform helix angle (lead). However, the helix angle may also be altered in accordance with the positions at which they are disposed in the lengthwise direction of the shaft. By way of example, by making the helix angles of the tooth surfaces 116, 117 of the tooth parts 112 located on the upstream side relative to the feeding direction be large, and the helix angles of the tooth surfaces 116, 117 of the tooth parts 112 located on the downstream side relative to the feeding direction small, the feed rate on the downstream side may be made greater than that on the upstream side. Further, the filling rate and density of the plant biomass feedstock may thus be made variable with respect to the position along the lengthwise direction of the shaft, enabling effective processing through shearing, diffusion, etc.

Figure 20:
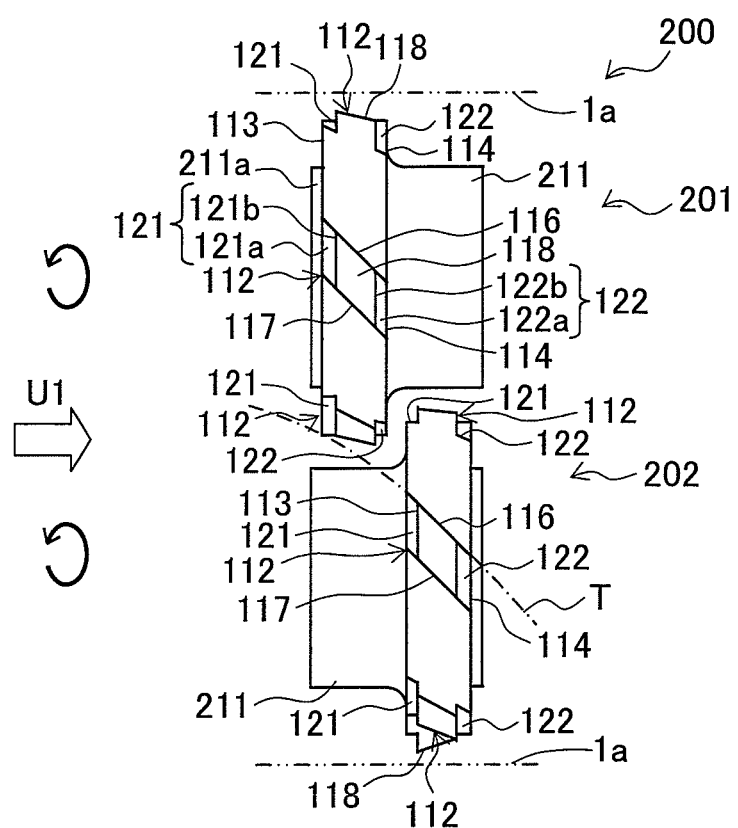
FIG. 20 is a diagram showing an example of a special fluffer ring.
Figure 21:
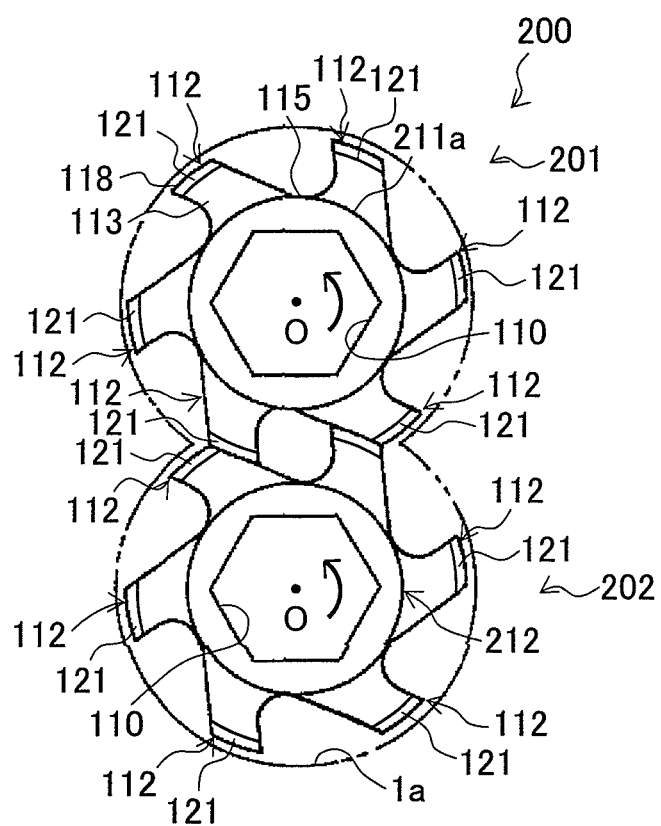
FIG. 21 is a view of FIG. 20 as observed in the direction of arrow U1.

Next, an example of the special fluffer ring 200, which is a screw segment of the present invention, is shown in FIG. 20 and FIG. 21. FIG. 20 is a diagram showing an example of a special fluffer ring. FIG. 21 is a view of FIG. 20 as observed in the direction of arrow U1, which is the feeding direction for the plant biomass feedstock. It is noted that like elements to those of the special gear kneader 100 discussed above are denoted by like reference numerals, thereby omitting detailed descriptions thereof.

The special fluffer ring 200 comprises a first rotating body 201 and a second rotating body 202. The first rotating body 201 and the second rotating body 202 are each configured to comprise a plurality of tooth parts 112 on a cylindrical shaft part 211. As shown in FIG. 21, the plurality of tooth parts 112 are provided in a protruding manner at predetermined intervals along the circumferential direction of the shaft part 211. In the present embodiment, six tooth parts 112 are disposed at regular intervals.

As shown in FIG. 20, the first rotating body 201 has a configuration where the tooth parts 112 are provided on the upstream side of the shaft part 211 relative to the feeding direction, which is the front side relative to the lengthwise direction of the shaft, and where the shaft part 211 protrudes towards the downstream side relative to the feeding direction, which is the rear side relative to the lengthwise direction of the shaft. Further, the second rotating body 202 has a configuration where the tooth parts 112 are provided on the downstream side of the shaft part 211 relative to the feeding direction, and where the shaft part 211 protrudes towards the upstream side relative to the feeding direction.

The first rotating body 201 and the second rotating body 202 are disposed in such a manner that the tooth parts 112 of the first rotating body 201 face the shaft part 211 of the second rotating body 202, and that the tooth parts 112 of the second rotating body 202 face the shaft part 211 of the first rotating body 201. The tooth parts 112 of the first rotating body 201 and the tooth parts 112 of the second rotating body 202 are disposed at positions close to one another in the feeding direction.

A passage that bends in a crank-like fashion is formed between the first rotating body 201 and the second rotating body 202 along the direction of arrow U1, which is the feeding direction, thereby ensuring the kneading capability and dispersing capability of the special fluffer ring 200.

The first rotating body 201 comprises a boss part 211a that protrudes further in the lengthwise direction of the shaft than the tooth parts 112. Further, the second rotating body 202 has the shaft part 211 provided further upstream relative to the feeding direction than the tooth parts 112.

The boss part 211a of the first rotating body 201 and the shaft part 211 of the second rotating body 202 prevent the plant biomass feedstock that is fed from the upstream side relative to the feeding direction from colliding with the front surfaces 113 of the tooth parts 112 located foremost with its flow speed maintained, thereby preventing an abrupt compression force from being applied to those tooth parts 112 locally, and reducing the torque fluctuation experienced by the motor that rotationally drives the screw shafts 7.

As shown in FIG. 21 for example, the first rotating body 201 and the second rotating body 202 have their rotation timings so set that the tooth parts 112 of one shaft part 211 and the tooth parts 112 of the other shaft part 211 approach and pass by one another halfway between the first rotating body 201 and the second rotating body 202.

Step parts 121, 122 are formed at the tip part of the tooth part 112. In the example shown in FIG. 20 and FIG. 21, the step part 121 is provided on all six tooth parts 112 disposed along the circumferential direction of the shaft for each of the first rotating body 101 and the second rotating body 102. The step parts 121, 122 need not be provided on all of the tooth parts 112 that the special fluffer ring 200 has. The locations, intervals, number, etc., of the tooth parts 112 having the step parts 121, 122 are determined as deemed appropriate depending on the circumstances.

The step part 121 is formed between the tooth surfaces 116, 117 at the edge part between the front surface 113 and the top surface 118 of the tooth part 112. The step part 122 is formed between the tooth surfaces 116, 117 at the edge part between the rear surface 114 and the top surface 118 of the tooth part 112. The thickness of each tooth part 112 on the tooth tip side is thus less than the thickness on the tooth base side.

The step part 121 is formed by cutting away the edge part between the front surface 113 and the top surface 118 of the tooth part 112 to create a level difference, and comprises a shaft lengthwise direction level difference surface 121a, which has a certain width in the lengthwise direction of the shaft at a position that is further inward in the radial direction than the top surface 118, and a shaft radial direction level difference surface 121b, which has a certain width in the radial direction of the shaft at a position that is further downstream relative to the feeding direction than the front surface 113.

The step part 122 is formed by cutting away the edge part between the rear surface 114 and the top surface 118 of the tooth part 112 to create a level difference, and comprises a shaft lengthwise direction level difference surface 122a, which has a certain width in the lengthwise direction of the shaft at a position that is further inward in the radial direction than the top surface 118, and a shaft radial direction level difference surface 122b, which has a certain width in the radial direction of the shaft at a position that is further upstream relative to the feeding direction than the rear surface 114.

With the special fluffer ring 200 having the configuration mentioned above, since the tooth part 112 comprises the vertical wall surface part 116b that is sloped at gradient angle θ towards the front side relative to the rotation direction, it is possible to reduce the radially outward biasing force that acts on the plant biomass feedstock. Thus, it is possible to prevent the occurrence of high density and high strength plugs (aggregates) caused by compression force and friction force being applied locally to the plant biomass feedstock within the passage 1a of the cylinder 1.

Further, by preventing the occurrence of plugs, the screw shafts 7 are prevented from deforming in the radial direction of the shaft, and the occurrence of wear and overload due to contact between the tooth parts 112 and the passage 1a of the cylinder 1 may be prevented.

In addition, in shearing the plant biomass feedstock by moving the tooth parts 112 that are adjacent in the lengthwise direction of the shaft in mutually opposing directions by way of the rotation of the first rotating body 201 and the second rotating body 202, since shearing may be performed with the vertical wall surface parts 116b that are sloped at gradient angle θ towards the front side relative to the rotation direction, the force required to shear the plant biomass feedstock may be reduced. Thus, the driving force for the extruder may be reduced, thereby enabling a reduction in the size of the drive unit.

In addition, since the tooth surfaces 116 of the tooth parts 112 have the helix angle indicated with phantom line T, the plant biomass feedstock may be fed towards the rear side with respect to the axial direction while being prevented from becoming highly compressed radially outward.

Further, since the step parts 121, 122 are provided on the tooth parts 112, the thickness of the tooth parts 112 on the tooth tip side is less than the thickness on the tooth base side, and the tooth surface 116 is narrower on the tooth tip side of the tooth parts 112 than on the tooth base side.

Thus, the feeding component and shearing force at the outermost part within the passage 1a where the plant biomass feedstock becomes high in density may be made smaller. Thus, the torque for rotating the screw shafts 7 may be reduced, enabling a reduction in the size of the drive motor.

In addition, the step parts 121, 122 are able to mitigate the compression force and friction force that are applied locally to the plant biomass feedstock by the tooth parts 112, and prevent the plant biomass feedstock from quickly becoming highly densified and highly strengthened at the outermost part within the passage 1a, thereby preventing the occurrence of plugs.

The configuration of the special fluffer ring 200 is by no means limited to the embodiment mentioned above, and various modifications and combinations are possible. By way of example, in the embodiment discussed above, a description has been provided taking as an example a case where the tooth parts 112 of the special fluffer ring 200 each comprise the two step parts 121, 122. However, it is also possible to adopt a configuration where one or both of the step parts 121, 122 are not provided on the tooth parts 112. In addition, it is also possible to adopt a configuration where, by way of example, a beveled part 131 (see the description for Embodiment 3 of the special gear kneader 100 discussed later) is provided on each of the tooth parts 112.

Figure 22:
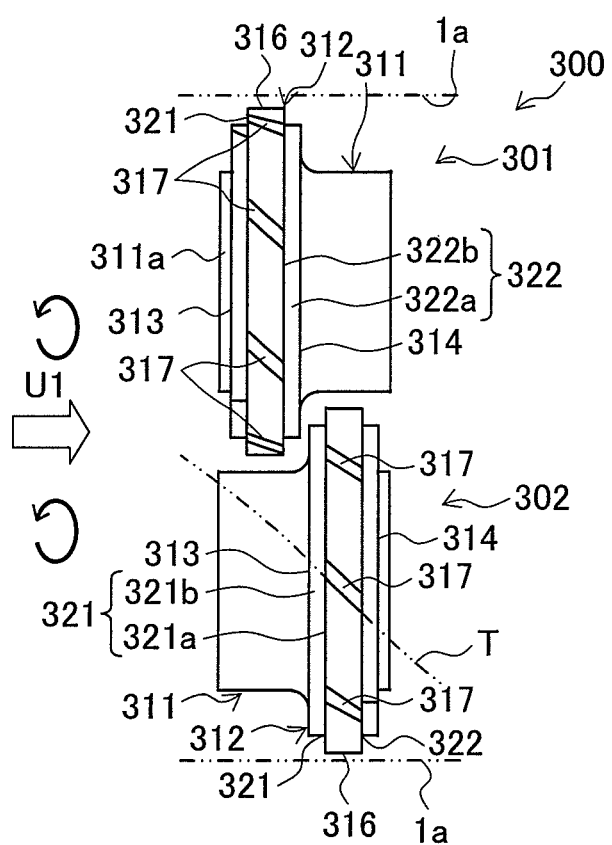
FIG. 22 is a diagram showing an example of seal rings.
Figure 23:
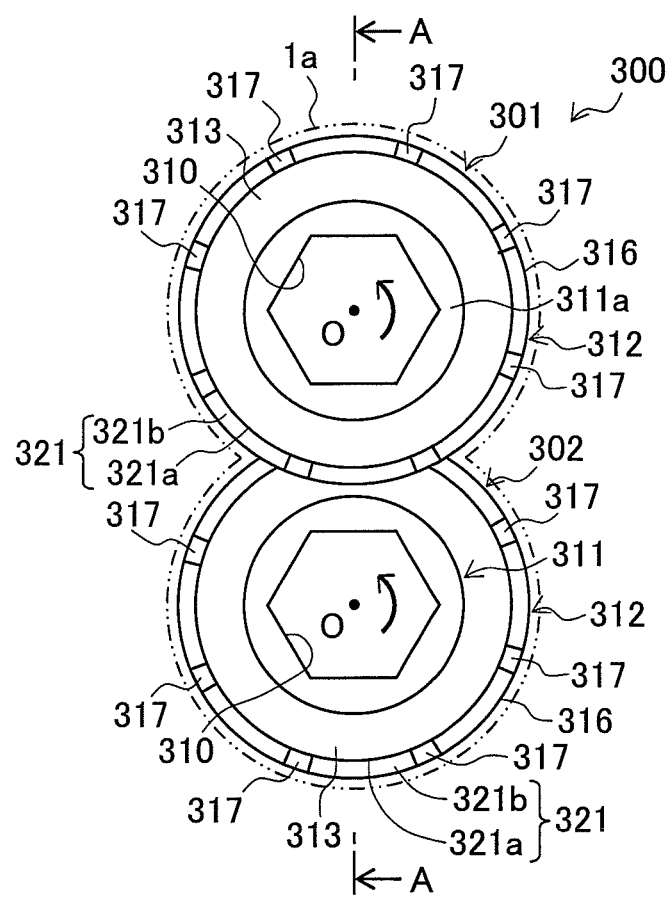
FIG. 23 is a view of FIG. 22 as observed in the direction of arrow U1.
Figure 24:
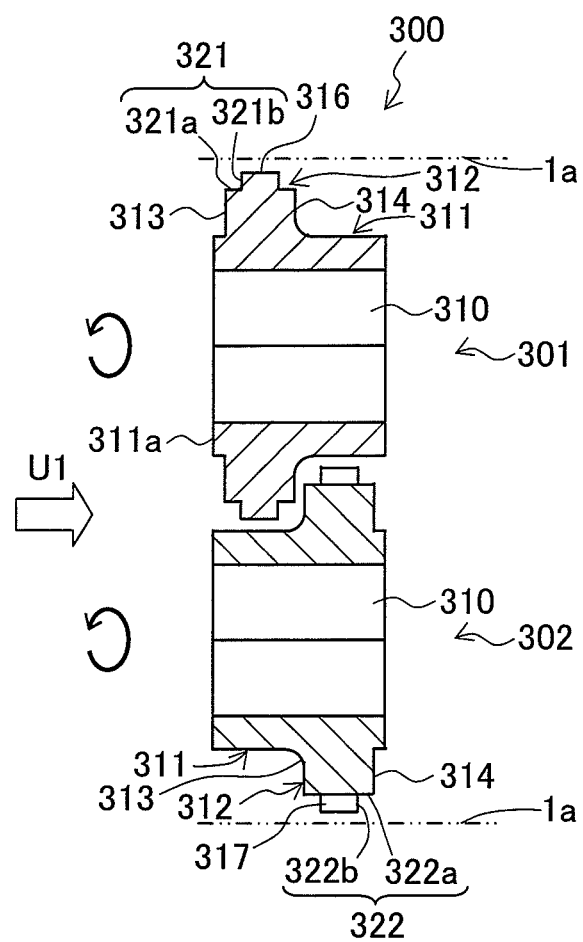
FIG. 24 is a sectional view of FIG. 23 taken along line A-A.

Next, an example of the special seal ring 300 is shown in FIG. 22 to FIG. 24. FIG. 22 is a diagram showing an example of a special seal ring. FIG. 23 is a view of FIG. 22 as observed in the direction of arrow U1, which is the feeding direction for the plant biomass feedstock. FIG. 24 is a sectional view taken along and as observed in the direction of arrowed line A-A in FIG. 23.

As shown in FIG. 22 to FIG. 24, the special seal ring 300 comprises a first rotating body 301 and a second rotating body 302. The first rotating body 301 and the second rotating body 302 are each configured to comprise a cylindrical shaft part 311, and an expanded diameter part 312 with an expanded diameter on the side of one end part of the shaft part 311.

As shown in FIG. 22, the first rotating body 301 is provided with the expanded diameter part 312 on the upstream side of the shaft part 311 relative to the feeding direction, which is the front side relative to the lengthwise direction of the shaft, and thus has a configuration where the shaft part 311 protrudes towards the downstream side relative to the feeding direction, which is the rear side relative to the lengthwise direction of the shaft. Further, the second rotating body 302 is provided with the expanded diameter part 312 on the downstream side of the shaft part 311 relative to the feeding direction, and thus has a configuration where the shaft part 311 protrudes towards the upstream side relative to the feeding direction.

The first rotating body 301 and the second rotating body 302 are disposed in such a manner that the expanded diameter part 312 of the first rotating body 301 faces the shaft part 311 of the second rotating body 302, and that the expanded diameter part 312 of the second rotating body 302 faces the shaft part 311 of the first rotating body 301. The expanded diameter part 312 of the first rotating body 301 and the expanded diameter part 312 of the second rotating body 302 are disposed at positions that are close to each other in the feeding direction.

As shown in FIG. 23, the first rotating body 301 and the second rotating body 302 are disposed with parts of the expanded diameter parts 312 mutually overlapping in the feeding direction at a position halfway between the first rotating body 301 and the second rotating body 302. The sealing capability of the special seal ring 300 between the upstream side and downstream side relative to the feeding direction is thus ensured.

The first rotating body 301 comprises a boss part 311a that protrudes further in the lengthwise direction of the shaft than the expanded diameter part 312. Further, the second rotating body 302 has the shaft part 311 provided further upstream than the expanded diameter part 312 relative to the feeding direction.

The boss part 311a of the first rotating body 301 and the shaft part 311 of the second rotating body 302 prevent the plant biomass feedstock that is fed from the upstream side relative to the feeding direction from colliding with front surfaces 313 of the expanded diameter parts 312 with its flow speed maintained, thereby preventing an abrupt compression force from being applied to those expanded diameter parts 312 locally, and reducing the torque fluctuation experienced by the motor that rotationally drives the screw shafts 7.

As shown in FIG. 23, a hexagonal through-hole 310 is provided in the shaft part 311 along the center axis of the shaft part 311. The special gear ring 300 is adapted to be capable of rotating with the screw shafts by inserting and securing the screw shafts 7 of the extruder in the through-holes 310.

The expanded diameter part 312 is in the shape of a short cylinder having a predetermined length in the axial direction and that is continuous in the lengthwise direction of the shaft part 311 with a uniform diameter. Its size is designed to be of such a size that an outer circumferential surface 316 of the expanded diameter part 312 faces the inner wall surface of the passage 1a with a predetermined gap therebetween.

Lead grooves 317 are provided in the outer circumferential surface 316 of the expanded diameter part 312. As shown in FIG. 22, the lead grooves 317 extend between the front surface 313 and rear surface 134 of the expanded diameter part 312, and place the upstream side of the expanded diameter part 31 relative to the feeding direction in communication with the downstream side relative to the feeding direction.

The lead grooves 317 have a predetermined helix angle (lead) such that they transition rearward relative to the rotation direction as they transition downstream relative to the feeding direction. In the present embodiment, they are so formed as to extend along helical phantom line T shown in FIG. 22.

The lead grooves 317 are capable of, within the passage 1a, letting through the plant biomass feedstock that is fed from the upstream side of the expanded diameter part 312 relative to the feeding direction. Thus, they prevent the upstream side of the special seal ring 300 relative to the feeding direction from becoming too high in pressure, thereby preventing the occurrence of plugs on the upstream side relative to the feeding direction.

As the first rotating body 301 and the second rotating body 302 rotate in the direction of the arrows, the lead grooves 317 are able to feed the plant biomass feedstock downstream relative to the feeding direction by virtue of the helix angle of the lead grooves 317. If the helix angle of the lead grooves 317 were zero, that is, if the lead grooves 317 were to extend in parallel to the center axis of the shaft part 311, their feeding capability with respect to the plant biomass feedstock would be zero, and the special seal ring 300 would loosen the plant biomass feedstock while shearing it. At least one or more lead grooves 317 are provided. In the present embodiment, a total of eight lead grooves 317 are disposed equidistantly along the circumference as shown in FIG. 23.

The lead grooves 317 are able to impart a feeding component in the flow direction while disrupting the flow of the plant biomass feedstock passing through the gap between the inner wall surface of the passage 1a and the special seal ring 300 and mitigating fluctuations in the plant biomass feedstock located on the upstream side of the special seal ring 300. They thus have an element of relief with respect to pressure and fluidity, thereby enabling a smooth resistance and holding state of the plant biomass feedstock.

They are thus able to stabilize the feeding resistance that suppresses the feeding of the plant biomass feedstock within the passage 1a of the cylinder 1, and to maintain the pressure difference between the upstream side and downstream side of the special seal ring 300. Thus, by way of example, the pressure of the hot compressed water treatment zone 12 formed between the resistor 31 and the resistor 33 of the cylinder 1 may be maintained, and pressure fluctuations within the hot compressed water zone may be suppressed to maintain it at a high temperature and a high pressure.

Further, by virtue of the lead grooves 317, it is possible to suppress the feeding of the plant biomass feedstock while guiding a portion thereof to the downstream side of the cylinder 1. Thus, the upstream side of the special seal ring 300 is prevented from becoming too high in pressure, thereby preventing the occurrence of plugs (aggregates) on the upstream side of the special seal ring 300.

Step parts 321, 322 are respectively provided on the upstream side of the expanded diameter part 312 relative to the feeding direction and on the downstream side relative to the feeding direction. The step part 321 is formed at the edge part between the front surface 313 and the outer circumferential surface 316 so as to be continuous along the circumference. The step part 322 is formed at the edge part between the rear surface 314 and the outer circumferential surface 316 so as to be continuous along the circumference.

The step part 321 is formed by cutting away the edge part between the front surface 313 and the outer circumferential surface 316 of the expanded diameter part 312 to create a level difference, and comprises a shaft lengthwise direction level difference surface 321a, which has a certain width in the lengthwise direction of the shaft at a position that is further inward in the radial direction than the outer circumferential surface 316, and a shaft radial direction level difference surface 321b, which has a certain width in the radial direction of the shaft at a position that is further downstream relative to the feeding direction than the front surface 313.

The step part 322 is formed by cutting away the edge part between the rear surface 314 and the outer circumferential surface 316 of the expanded diameter part 312 to create a level difference, and comprises a shaft lengthwise direction level difference surface 322a, which has a certain width in the lengthwise direction of the shaft at a position that is further inward in the radial direction than the outer circumferential surface 316, and a shaft radial direction level difference surface 322b, which has a certain width in the radial direction of the shaft at a position that is further upstream relative to the feeding direction than the rear surface 314.

The step part 321 is able to mitigate the compression force and friction force that are applied locally to the plant biomass feedstock by the expanded diameter part 312, and prevents the plant biomass feedstock from quickly becoming highly densified and highly strengthened at the outermost part located radially outward within the passage 1a, thereby preventing the occurrence of plugs.

In addition, the step part 321 is able to reduce the surface area of the front surface 313 of the expanded diameter part 312. Thus, it is able to make the compression force and friction force generated when the plant biomass feedstock that is fed from the upstream side relative to the feeding direction comes into contact with the front surface 313 of the expanded diameter part 312 be relatively small. Thus, the torque for rotating the screw shafts 7 may be reduced, thereby enabling a reduction in the size of the drive motor.

It is noted that the configuration of the lead grooves 317 is by no means limited to the embodiment discussed above, and that by altering, as deemed appropriate, the number of grooves, the size of the grooves, the shape of the grooves, etc., with respect to the lead grooves 317, the element of relief and the filling rate may be readily varied.

Embodiment 2

Figure 12:
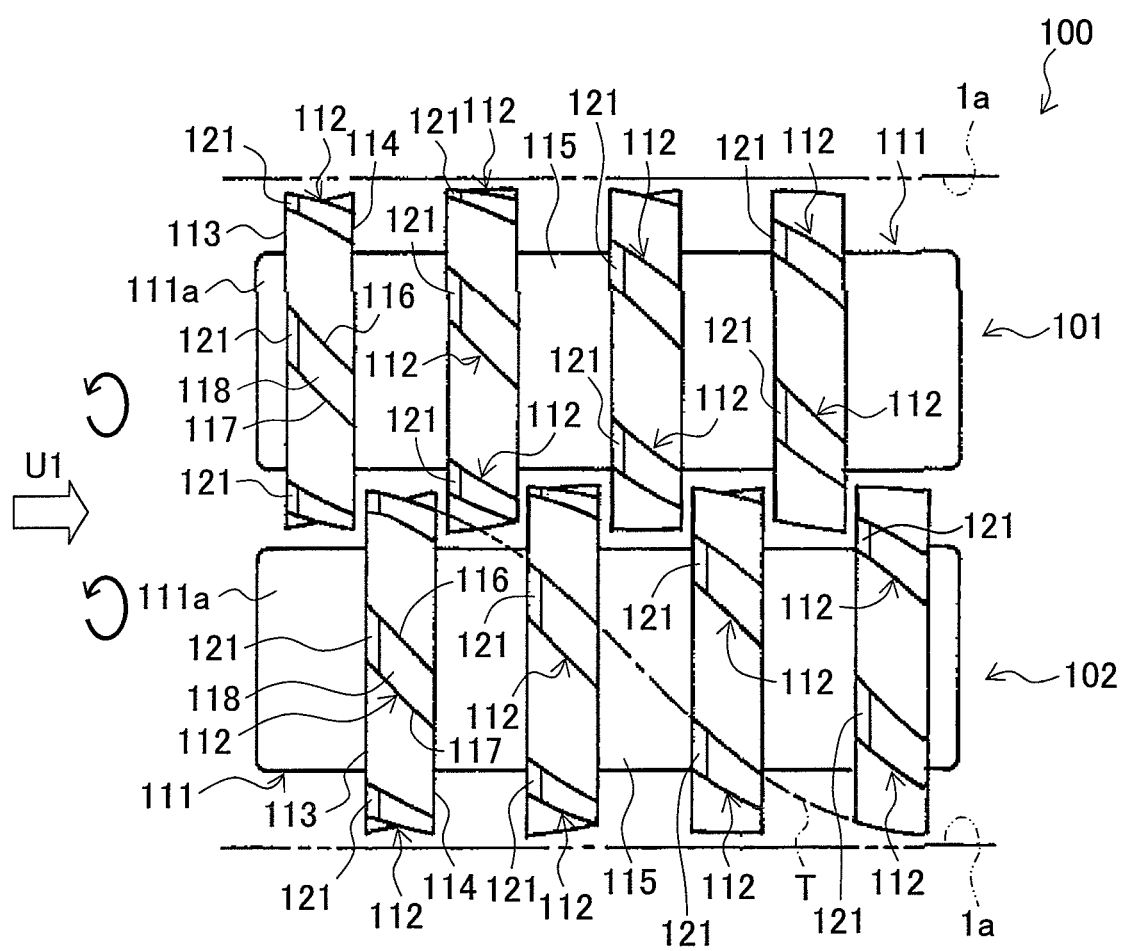
FIG. 12 is a diagram showing another example of a special gear kneader.
Figure 13:
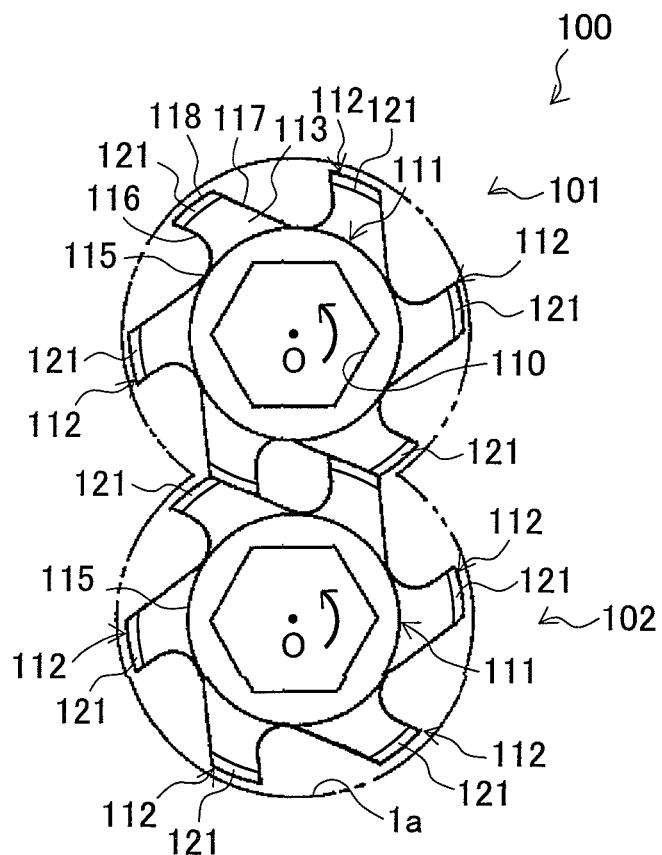
FIG. 13 is a view of FIG. 12 as observed in the direction of arrow U1.
Figure 14:
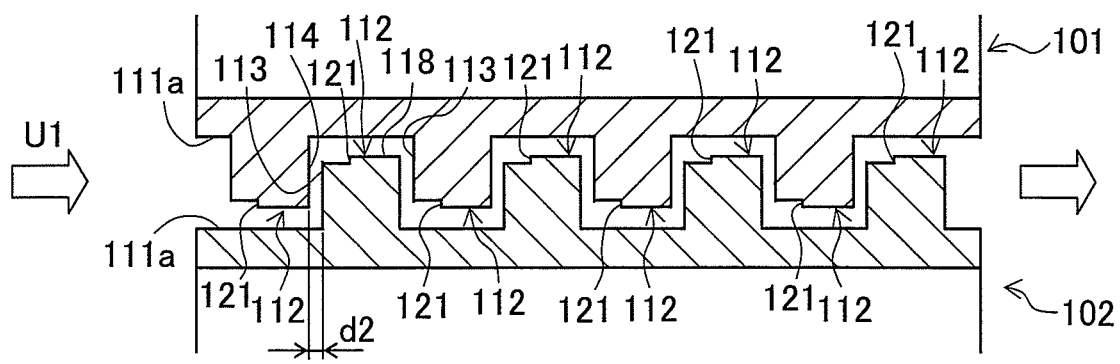
FIG. 14 is a schematic diagram showing, in a cross section, a gear intermeshing state of the special gear kneader in FIG. 12.
Figure 15:
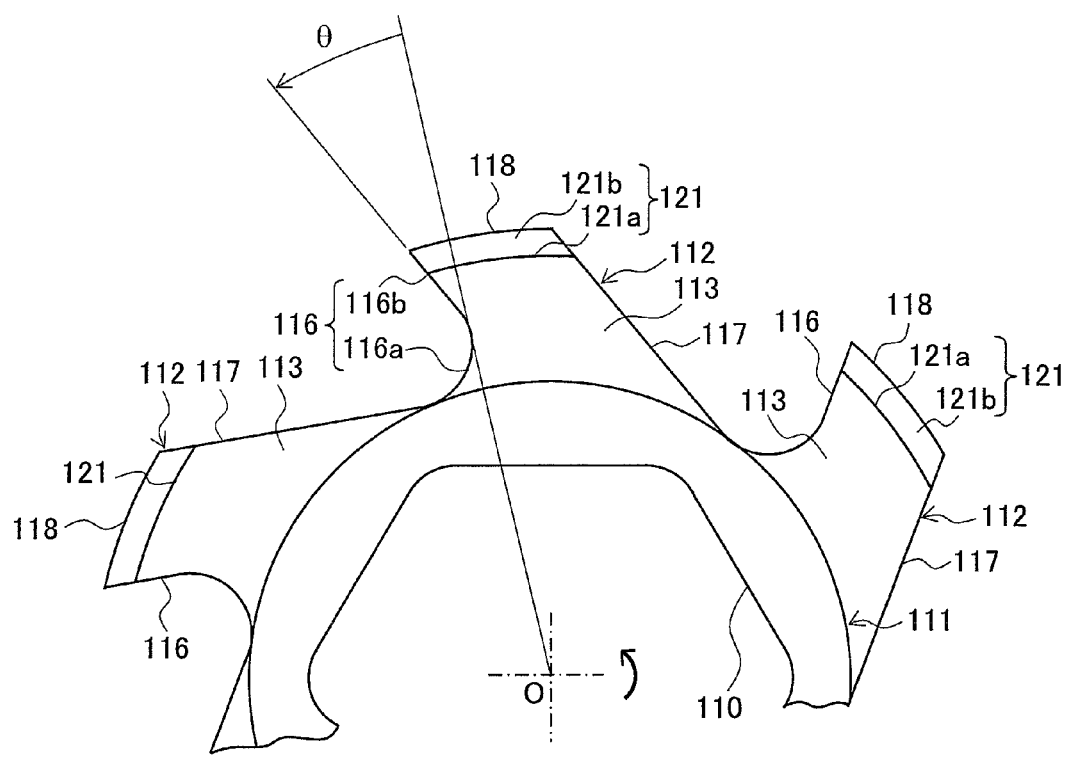
FIG. 15 is an enlarged view of some of the tooth parts shown in FIG. 13.

Embodiment 2 is described with reference to FIG. 12 to FIG. 15. In Embodiment 2, another example of the special gear kneader 100, which is a screw segment of the present invention, is described. FIG. 12 is a diagram showing another example of a special gear kneader. FIG. 13 is a view of the special gear kneader as observed in the direction of arrow U1 indicated in FIG. 12. FIG. 14 is a schematic diagram showing a gear intermeshing state of the special gear kneader. FIG. 15 is an enlarged view showing some of the tooth parts.

As shown in FIG. 12 and FIG. 13, the special gear kneader 100 is characterized in that the step part 121 is formed at the tip part of the tooth part 112. In the example shown in FIG. 12 to FIG. 15, the step part 121 is provided on all six tooth parts 112 that are disposed along the circumferential direction of the shaft for each of the first rotating body 101 and the second rotating body 102.

The step part 121 need not be provided on all of the tooth parts 112 that the special gear kneader 100 has. The locations, intervals, number, etc., of the tooth parts 112 having the step part 121 are determined as deemed appropriate depending on the circumstances.

As shown in FIG. 12 and FIG. 13 for example, the step part 121 is formed between the tooth surfaces 116, 117 at the edge part between the front surface 113 and the top surface 118 of the tooth part 112. The thickness of each tooth part 112 on the tip side is thus less than the thickness on the base side.

As shown in FIG. 14 and FIG. 15, the step part 121 is formed by cutting away the edge part between the front surface 113 and the top surface 118 of the tooth part 112 to create a level difference, and comprises a shaft lengthwise direction level difference surface 121a, which has a certain width in the lengthwise direction of the shaft at a position that is further inward in the radial direction than the top surface 118, and a shaft radial direction level difference surface 121b, which has a certain width in the radial direction of the shaft at a position that is further downstream relative to the feeding direction than the front surface 113.

Since the tooth part 112 is formed in such a manner that, by virtue of the step part 121, the thickness of the tooth part 112 on the tip side is less than the thickness on the base side, it is possible to reduce the feeding component and shearing force on the radially outer side within the passage 1a where the plant biomass feedstock becomes high in density. Thus, the torque for rotating the screw shafts may be reduced, thereby enabling a reduction in the size of the drive motor.

In addition, the step part 121 is able to mitigate the compression force and friction force that are applied locally to the plant biomass feedstock by the tooth parts 112, and prevents the plant biomass feedstock from quickly becoming highly densified and highly strengthened at the outermost part located radially outward within the passage 1a, thereby preventing the occurrence of plugs.

Embodiment 3

Figure 16:
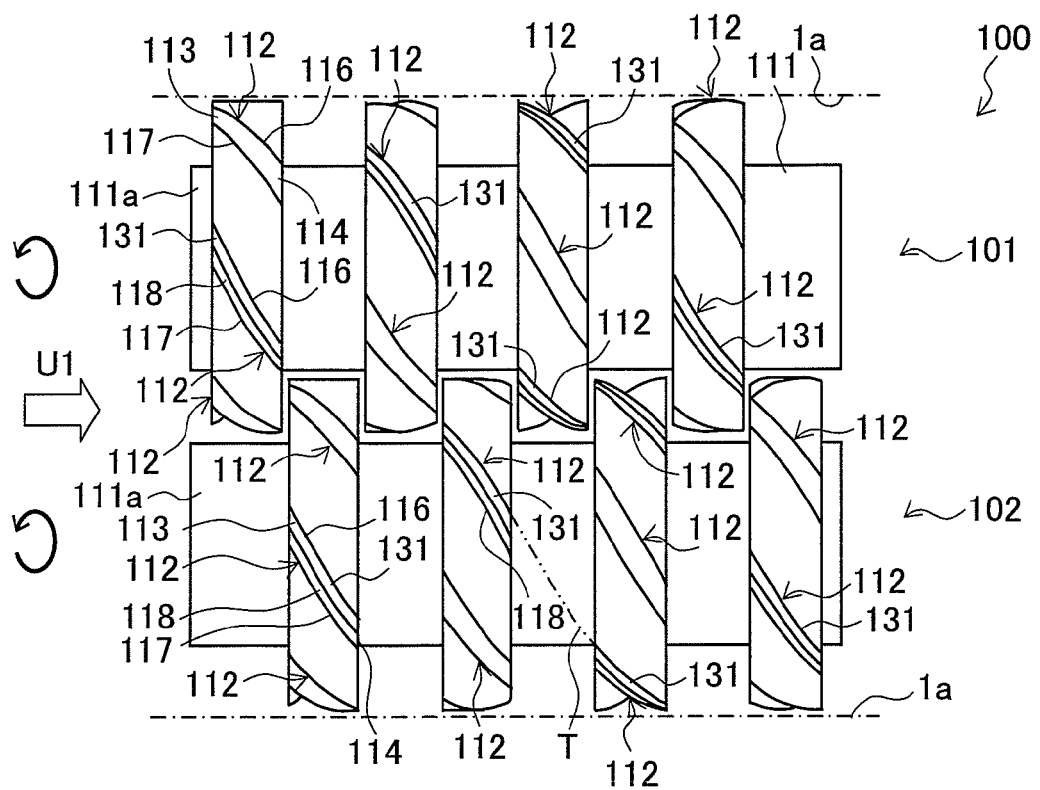
FIG. 16 is a diagram showing another example of a special gear kneader.
Figure 17:
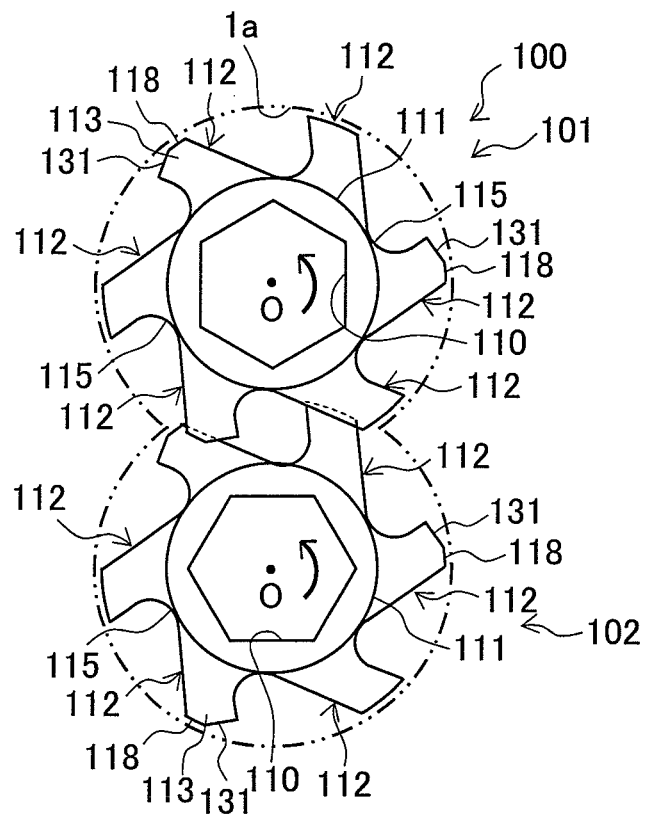
FIG. 17 is a view of FIG. 16 as observed in the direction of arrow U1.
Figure 18:
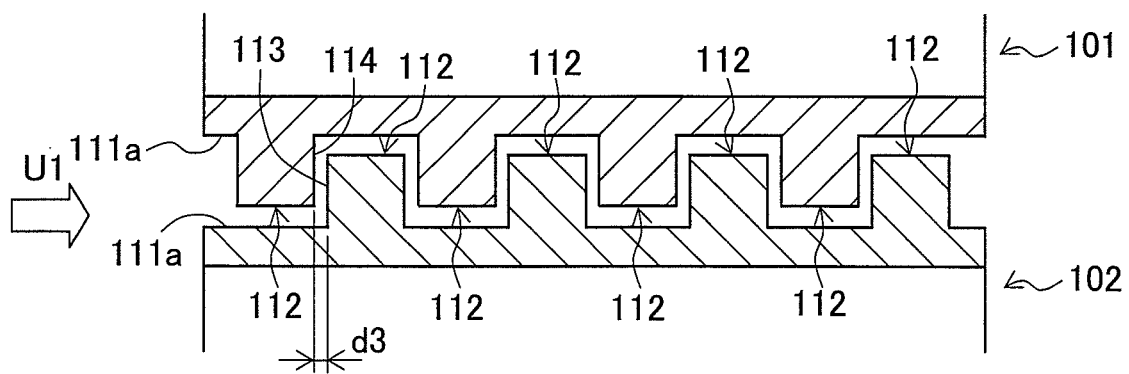
FIG. 18 is a schematic diagram showing, in a cross section, a gear intermeshing state of the special gear kneader in FIG. 16.
Figure 19:
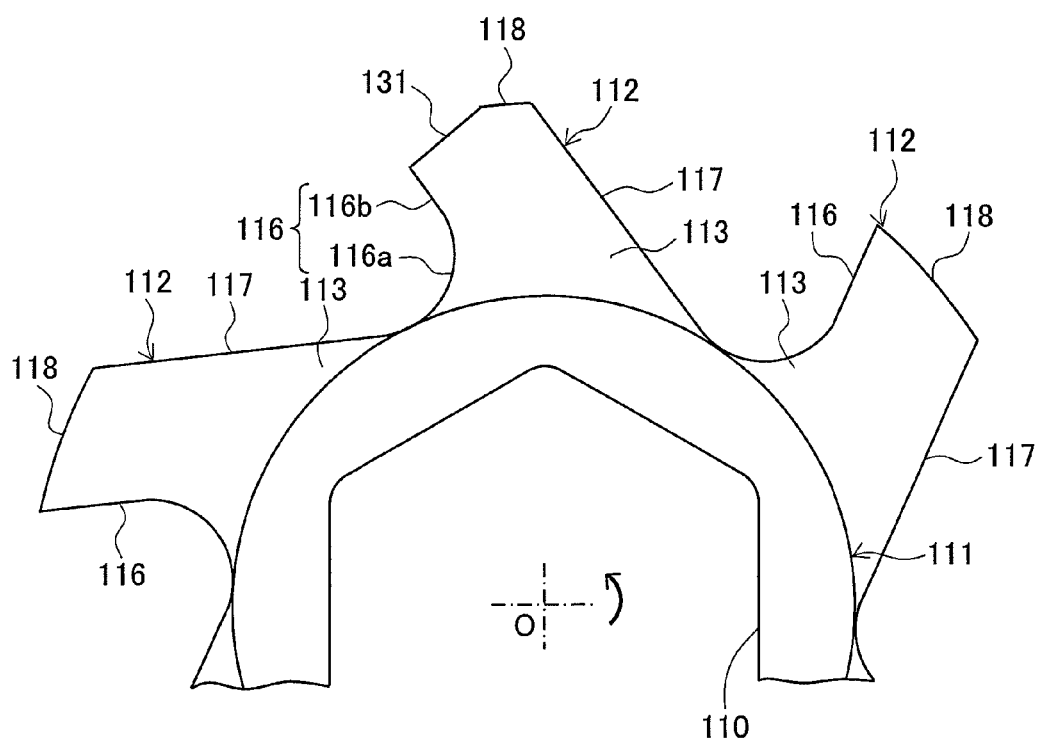
FIG. 19 is an enlarged view of some of the tooth parts shown in FIG. 17.

Embodiment 3 is described with reference to FIG. 16 to FIG. 19. In Embodiment 3, a further example of the special gear kneader 100, which is a screw segment of the present invention, is described. FIG. 16 is a diagram showing another example of a special gear kneader. FIG. 17 is a view of the special gear kneader as observed in the direction of arrow U1 indicated in FIG. 16. FIG. 18 is a schematic diagram showing a gear intermeshing state of the special gear kneader. FIG. 19 is an enlarged view showing some of the tooth parts.

As shown in FIG. 17 and FIG. 19 in particular, the special gear kneader 100 is characterized in that the beveled part 131 is formed at the tip part of the tooth part 112. The beveled part 131 need not be provided on all of the tooth parts 112 that the special gear kneader 100 has. It need only be provided on at least one of the plurality of tooth parts 112 disposed at predetermined intervals along the circumferential direction of the shaft, and need only be provided on at least one of the plurality of tooth parts 112 disposed at predetermined intervals along the lengthwise direction of the shaft.

The locations, intervals, number, etc., of the tooth parts 112 having the beveled part 131 are determined as deemed appropriate depending on the circumstances. In the example shown in FIG. 16 to FIG. 19, of the six tooth parts 112 disposed along the circumferential direction of the shaft with respect to each of the first rotating body 101 and the second rotating body 102, three tooth parts 112 are provided with the beveled part 131, and the tooth parts 112 with the beveled part 131 and the tooth parts 112 without the beveled part 131 are alternately disposed along the circumferential direction of the shaft.

As shown in FIG. 16 and FIG. 19, the beveled part 131 is formed between the front surface 113 and the rear surface 114 of the tooth part 112 at the edge part between the tooth surface 116 and the top surface 118, and has a flat shape that is sloped so as to transition further outward in the radial direction of the shaft the further it transitions rearward relative to the rotation direction.

Since the beveled part 131 is provided at the tip part of the tooth part 112, and is sloped so as to transition further outward in the radial direction of the shaft the further it transitions rearward relative to the rotation direction, a portion of the plant biomass feedstock that lies on the front side of the tooth part 112 relative to the rotation direction may be moved to the rear side of the tooth part 112 relative to the rotation direction by being let through the gap between the beveled part 131 and the inner wall surface of the passage 1a.

In addition, the beveled part 131 is able to reduce the feeding component and shearing force on the radially outer side within the passage 1a where the plant biomass feedstock becomes high in density. Thus, the torque for rotating the screw shafts 7 may be reduced, thereby enabling a reduction in the size of the drive motor.

In addition, the beveled part 131 is able to mitigate the compression force and friction force that are applied locally to the plant biomass feedstock by the tooth parts 112, and prevents the plant biomass feedstock from quickly becoming highly densified and highly strengthened at the outermost part located radially outward within the passage 1a, thereby preventing the occurrence of plugs.

As shown in FIG. 18, angular U-shaped and angular inverted-U-shaped gaps are formed between the first rotating body 101 and the second rotating body 102 so as to be continuous in the direction of arrow U1, which is the feeding direction. The beveled part 131 is able to prevent the plant biomass feedstock that lies on the front side of the tooth part 112 relative to the rotation direction from becoming highly densified and highly strengthened. Thus, gap d3 between the rear surface 114 of the tooth part 112 located on the upstream side relative to the feeding direction and the front surface 113 of the tooth part 112 partially facing that rear surface 114 and located on the downstream side relative to the feeding direction may be made narrower (d3<d1, d3<d2). Thus, the plant biomass feedstock may be further refined among the plurality of tooth parts 112 disposed along the lengthwise direction of the shaft.

The configuration of the special gear kneader 100 is by no means limited to the contents of the embodiments mentioned above, and various combinations are possible. By way of example, a configuration comprising the tooth parts 112 with the step part 121 and the tooth parts 112 with the beveled part 131 may be adopted, or a configuration where the tooth parts 112 comprise both the step part 121 and the beveled part 131 may be adopted as well.

Embodiment 4

Figure 25:
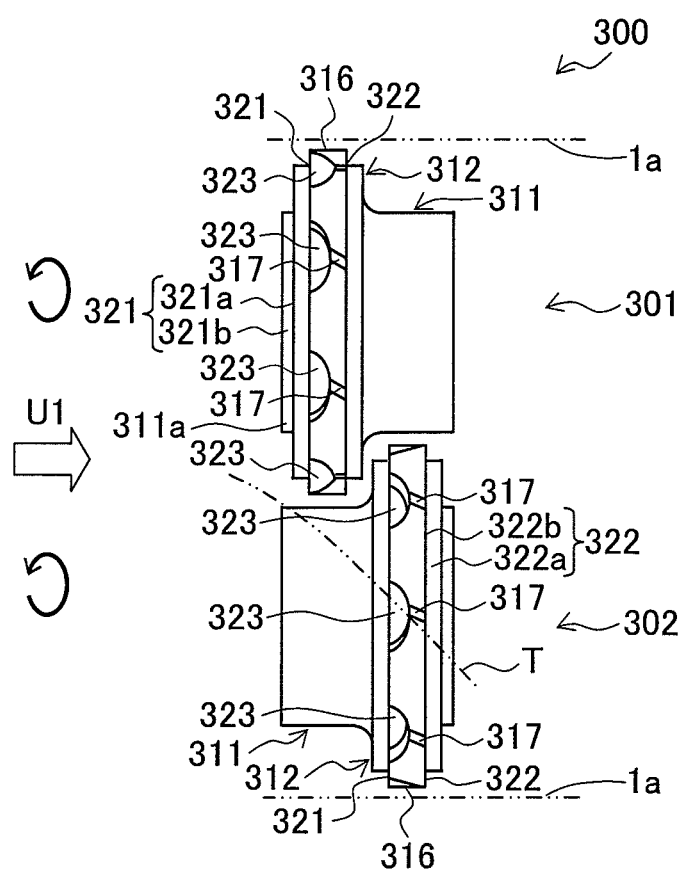
FIG. 25 is a diagram showing another example of seal rings.
Figure 26:
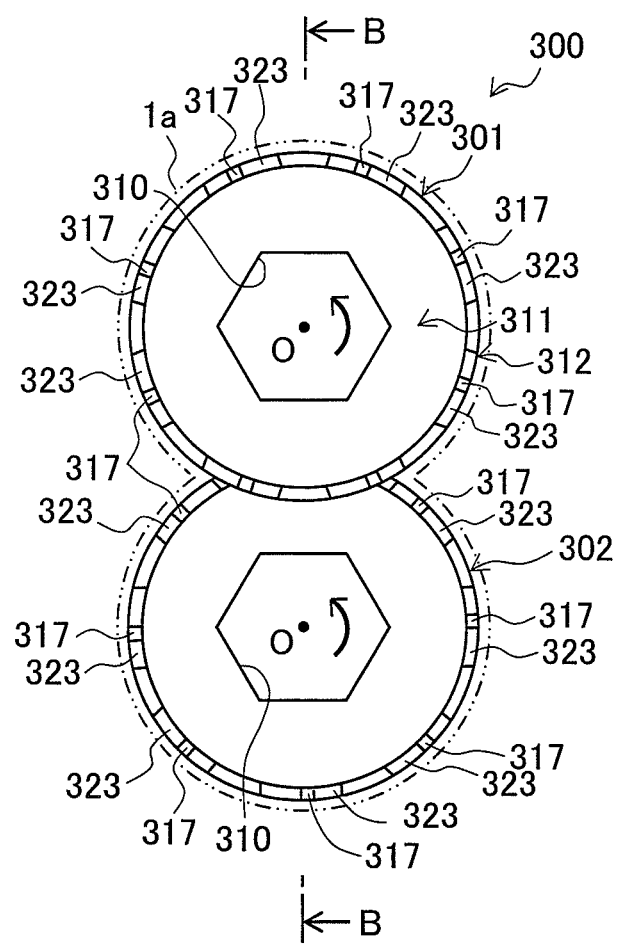
FIG. 26 is a view of FIG. 25 as observed in the direction of arrow U1.
Figure 27:
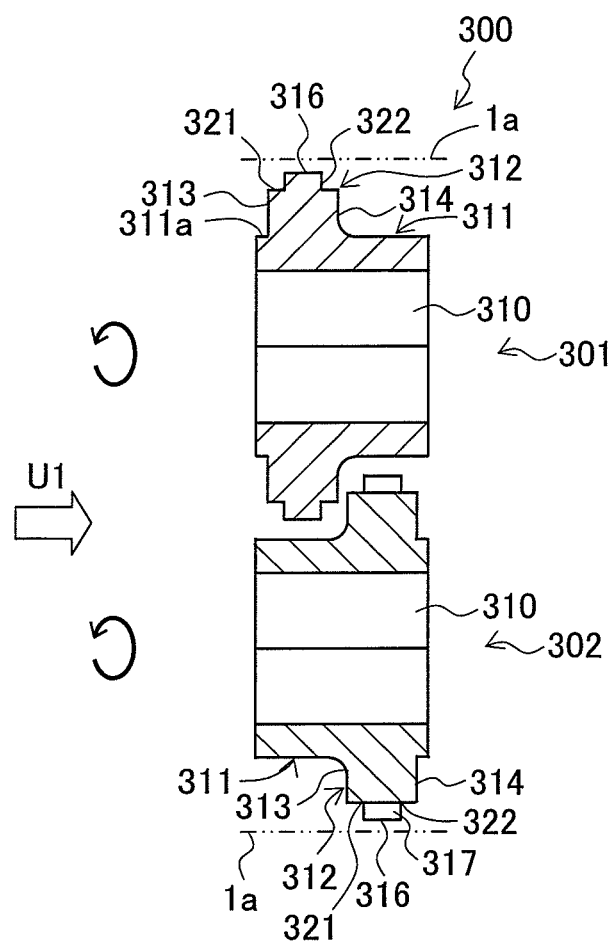
FIG. 27 is a sectional view of FIG. 26 taken along line B-B.

Embodiment 4 is described with reference to FIG. 25 to FIG. 27. In Embodiment 4, another example of the special seal ring 300 is described. FIG. 25 is a diagram showing an example of a seal ring. FIG. 26 is a view of FIG. 25 as observed in the direction of arrow U1, which is the feeding direction for the plant biomass feedstock. FIG. 27 is a sectional view taken along and as observed in the direction of arrowed line B-B in FIG. 25.

As shown in FIG. 25 and FIG. 26, the special seal ring 300 is characterized in that recessed parts 323 are provided in the outer circumferential surface 316. The recessed part 323 has a shape where the upstream side relative to the feeding direction opens forward, and where the downstream side relative to the feeding direction is narrower than the upstream side relative to the feeding direction and is in communication with the upstream part of the lead groove 317.

A total of eight lead grooves 317 are provided in the outer circumferential surface 316 of the expanded diameter part 312. The recessed parts 323 are respectively provided at positions corresponding to these lead grooves 317.

As shown in FIG. 26 for example, the recessed part 323 has a depth that is generally similar to the groove depth of the lead grooves 317. Further, as shown in FIG. 25 for example, it has a semicircular shape that protrudes downstream relative to the feeding direction from the shaft radial direction level difference surface 321b of the step part 321. Further, the lead groove 317 is connected to the end part of the recessed part 323 on the downstream side relative to the feeding direction.

The recessed parts 323 are able to move a portion of the plant biomass feedstock to the outermost part within the passage 1a while stirring it. Thus, the flow of the plant biomass feedstock between the special seal ring 300 and the passage 1a is made to be a more complex flow, and the gap between the upstream side and downstream side of the special seal ring 300 is sealed, thereby making it possible to maintain the pressure of the zone formed between the seal ring 330 provided upstream in the passage 1a and the special seal ring 300 provided downstream.

In addition, since the recessed parts 323 have a semicircular shape that becomes narrower the further it transitions downstream relative to the feeding direction, they are able to mitigate the compression force and friction force that are applied locally to the plant biomass feedstock by the outer circumferential surface 316 of the special seal ring 300, and they prevent the plant biomass feedstock from quickly becoming highly densified and highly strengthened at the outermost part, thereby preventing the occurrence of plugs.

It is noted that the shape of the recessed parts 323 is by no means limited to a semicircular shape, and they need only be of a shape that is capable of making the flow of the plant biomass feedstock be a complex flow, and may, for example, be of some other shape, such as semi-elliptical, triangular, etc.

Embodiment 5

Figure 28:
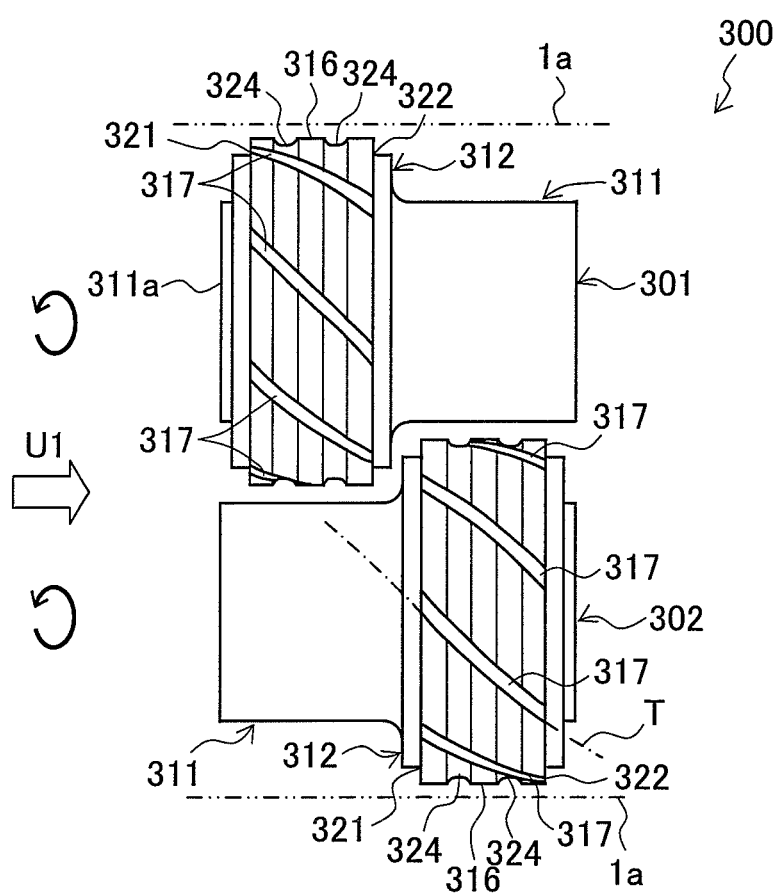
FIG. 28 is a diagram showing another example of seal rings.
Figure 29:
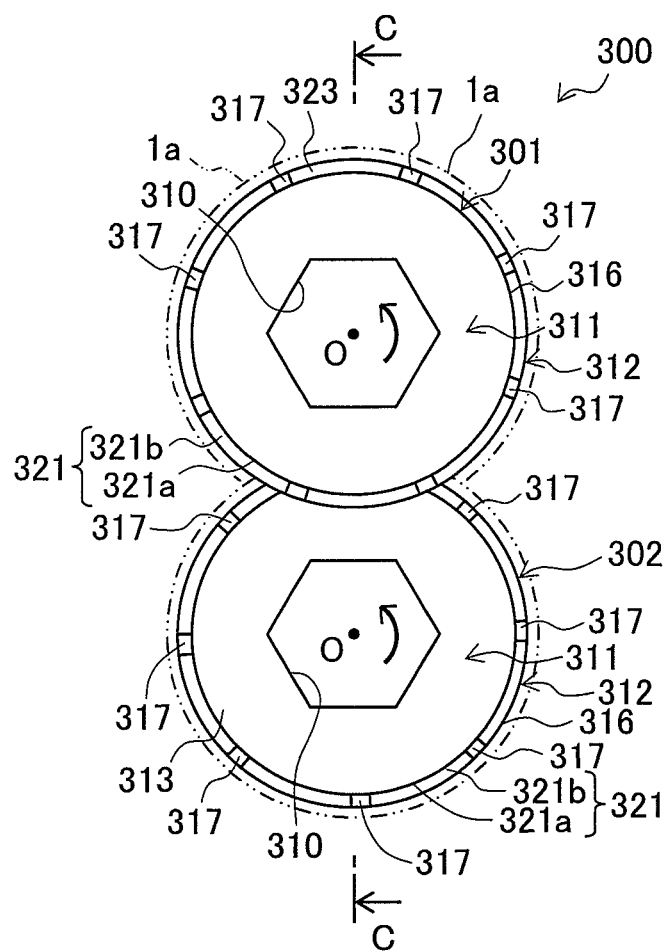
FIG. 29 is a view of FIG. 28 as observed in the direction of arrow U1.
Figure 30:
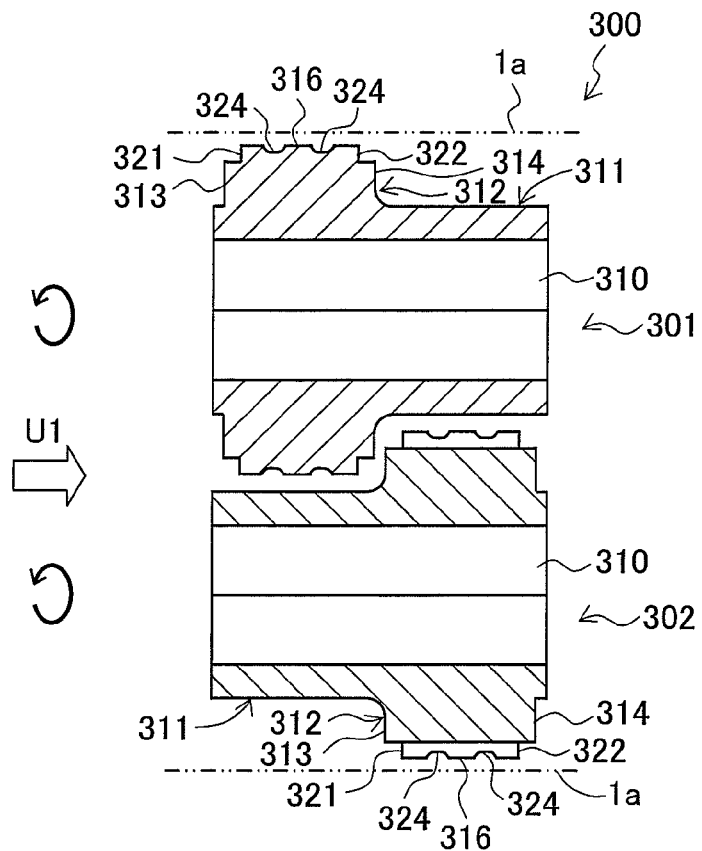
FIG. 30 is a sectional view of FIG. 29 taken along line C-C.
Figure 31:
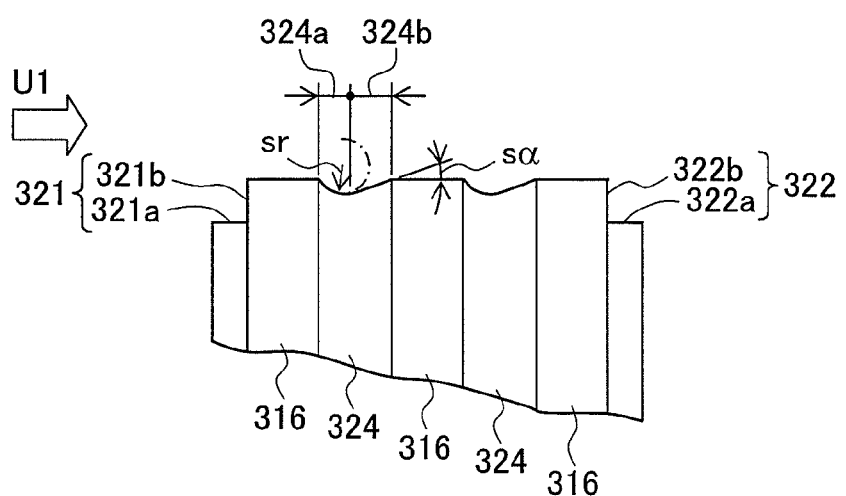
FIG. 31 is an enlarged view of a key portion in FIG. 28.

Next, a further example of the special seal ring 300 is shown in FIG. 28 to FIG. 31. FIG. 28 is a diagram showing an example of a seal ring. FIG. 29 is a view of FIG. 28 as observed in the direction of arrow U1, which is the feeding direction for the plant biomass feedstock. FIG. 30 is a sectional view taken along and as observed in the direction of arrowed line C-C in FIG. 29. FIG. 31 is an enlarged view showing a key portion in FIG. 28.

The special seal ring 300 is characterized in that at least one circumferential direction groove 324 is provided in the outer circumferential surface 316 of the expanded diameter part 312. As shown in FIG. 28, the circumferential direction groove 324 is so formed as to extend along the circumferential direction of the outer circumferential surface 316, and in the present embodiment, two are provided with a predetermined gap in-between in the lengthwise direction of the shaft. As shown in FIG. 31, the circumferential direction groove 324 comprises a concave surface part 324a, which forms the upstream part of the circumferential direction groove 324 relative to the feeding direction, and a tapered part 324b, which forms the downstream part of the circumferential direction groove 324 relative to the feeding direction.

The concave surface part 324a is so formed that its cross-section has a concave arc shape with a uniform radius of curvature, sr. The tapered part 324b is so formed that its cross-section has a sloped shape that gradually transitions radially outward at gradient angle sa as it transitions downstream of the concave surface part 324a relative to the feeding direction.

Thus, as the plant biomass feedstock that is fed towards the downstream side from the upstream side within the passage 1a travels from a position facing the outer circumferential surface 316 to a position facing the circumferential direction groove 324, the pressure acting on the plant biomass feedstock may be reduced dramatically by virtue of the concave surface part 324a of the circumferential direction groove 324, thereby easing fluctuations in pressure and flow. Then, by virtue of the tapered part 324b of the circumferential direction groove 324, fluctuations in pressure and flow acting on the plant biomass feedstock may be increased gradually.

Further, by having the easing and increasing of the pressure, etc., of the plant biomass feedstock repeated by the plurality of circumferential direction grooves 324, the pressure and resistance in the flow direction of the plant biomass feedstock may be smoothed, and safer seal resistance (fluidity) may be attained. Further, it is particularly effective with respect to the sealing characteristics of high-temperature and high-pressure zones where the plant biomass feedstock is highly densified rapidly.

There may be just one circumferential direction groove 324, or there may be three or more. Further a configuration may be adopted where a gentle helix angle is given so that it gradually transitions downstream relative to the feeding direction as it transitions rearward relative to the rotation direction, thereby easing fluctuations in the pressure acting on the plant biomass feedstock.

Embodiments 6 to 8

Figure 32:
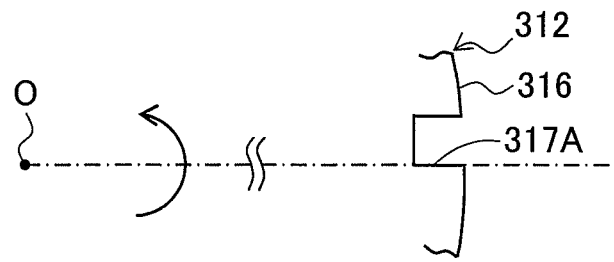
FIG. 32 is a diagram showing the sectional shape of a lead groove provided on a seal ring.
Figure 33:
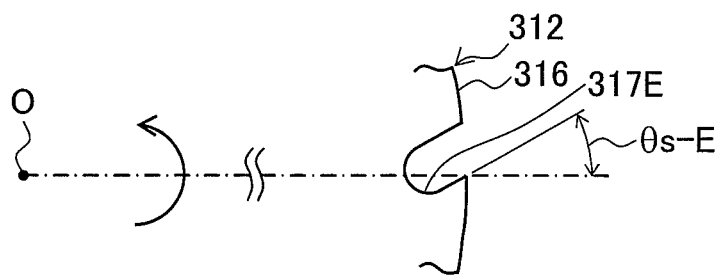
FIG. 33 is a diagram showing the sectional shape of a lead groove provided on a seal ring.
Figure 34:
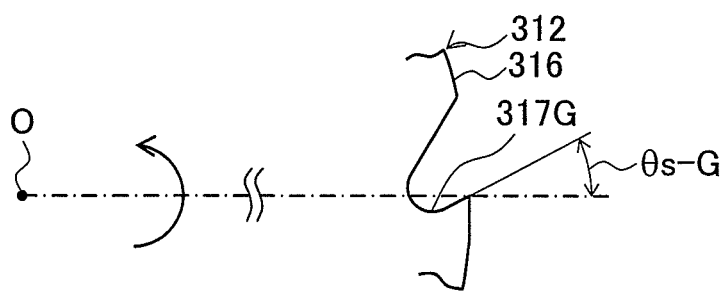
FIG. 34 is a diagram showing the sectional shape of a lead groove provided on a seal ring.

FIG. 32 to FIG. 34 are diagrams showing sectional shapes of lead grooves provided on seal rings.

The lead grooves 317 are provided in the outer circumferential surface 316 of the expanded diameter part 312. The lead grooves 317 extend between the front surface 313 and the rear surface 134 of the expanded diameter part 312, and place the upstream side of the expanded diameter part 312 relative to the feeding direction in communication with the downstream side relative to the feeding direction.

A lead groove 317A of Embodiment 6 shown in FIG. 32 has a groove shape with an angular generally U-shaped cross-section that is cut away from the outer circumferential surface 316 along the radial direction. Further, a lead groove 317E of Embodiment 7 shown in FIG. 33 has a groove shape with a generally U-shaped cross-section that is cut away from the outer circumferential surface 316 rearward relative to the rotation direction so as to be at an angle of predetermined angle θs-E with respect to the radial direction. Further, a lead groove 317G of Embodiment 8 shown in FIG. 34 has a groove shape with a generally V-shaped cross-section that is cut away from the outer circumferential surface 316 rearward relative to the rotation direction so as to be at an angle of predetermined angle θs-G with respect to the radial direction.

The feeding force created by the stirring and flow caused by the lead grooves 317A, 317E, 317G increases in the following order: lead groove 317A, 317E, 317G (317A<317E<317G). In addition, their element of relief may be designed as desired by way of groove conditions and size.

The flow resistance of the plant biomass feedstock may be varied in accordance with the outer diameter of the expanded diameter part 312.

With respect to the screw segments described above, they do not necessarily have to be used all at the same time. They are selected as deemed appropriate in accordance with the conditions, and are used by being attached to the screw shafts 7.

Various embodiments of the present invention have been described hereinabove in detail using the drawings. However, its specific configuration is by no means limited to the above, and even if design modifications, etc., within a scope that does not depart from the spirit of the present invention were to be made, they are to be included in the present invention.

By way of example, the screw arrays disposed in the passage 1a of the cylinder 1, the helix angle, the pitch, L/D, the number of screws and paddles, etc., may be chosen as deemed appropriate and as needed. In addition, although examples have been described with respect to twin screw extruders, this is by no means limiting, and application to single screw extruders or multi screw extruders with three or more screws is also possible.

Figure 35:
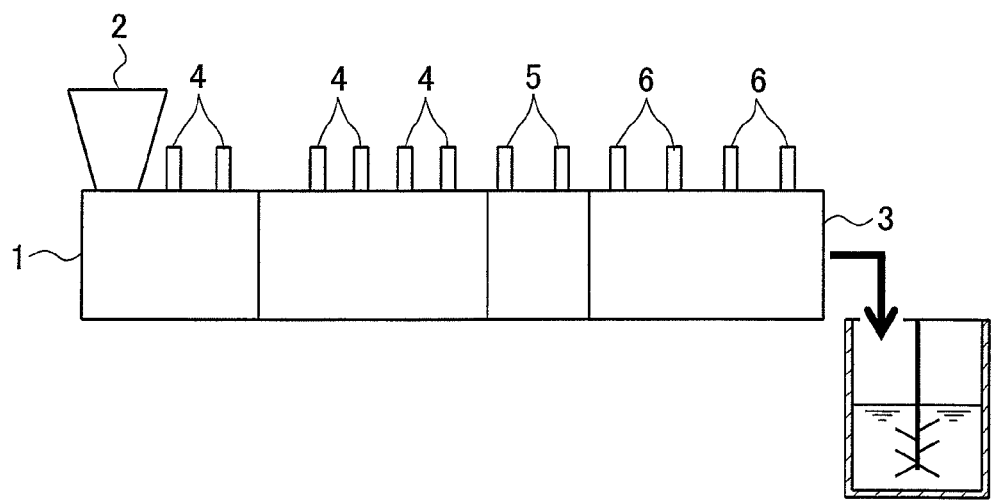
FIG. 35 is a schematic diagram showing another embodiment of a twin screw extruder of the present invention.

FIG. 35 is a schematic diagram showing another example of a twin screw extruder with respect to the present embodiments. As shown in FIG. 35, the screw extruder may comprise a plurality of the decomposing agent supplying parts 4, refrigerant supplying parts 5, and enzyme supplying parts 6 along the flow direction of the cylinder 1. With such a configuration, the decomposing agent, refrigerant, and enzyme may be supplied at optimal times depending on the processing state of the plant biomass feedstock within the passage 1a.

Figure 36:
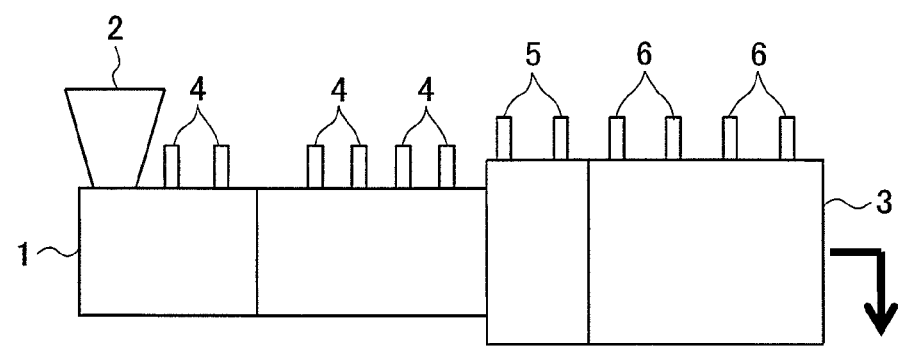
FIG. 36 is a schematic diagram showing another embodiment of a twin screw extruder of the present invention.

In addition, as shown in FIG. 36, the screw extruder may also be of a configuration where the diameter of the cylinder 1 is expanded at an intermediate position. With such a configuration, the flow speed within the passage 1a may be made slower at the part with the larger diameter on the downstream side, thereby securing longer periods for the cooling step, saccharization preparation step, etc.

Figure 37:
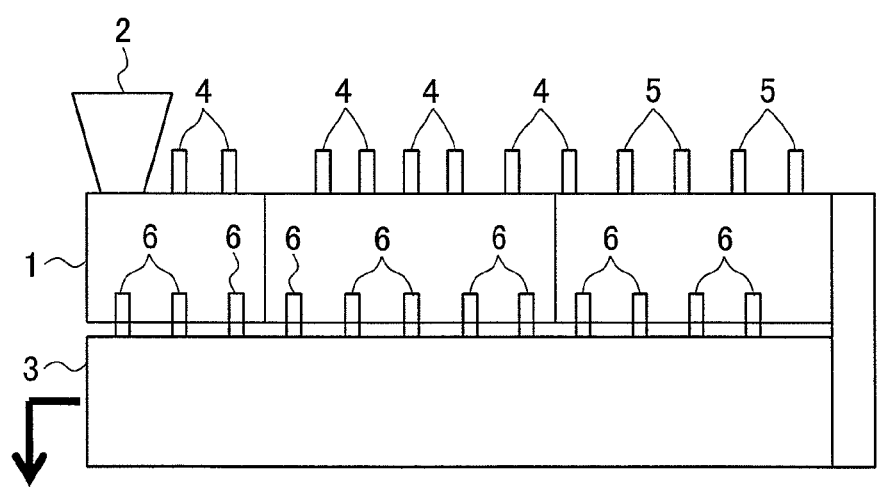
FIG. 37 is a schematic diagram showing another embodiment of a twin screw extruder of the present invention.

In addition, as shown in FIG. 37, the screw extruder may also be of a configuration where the cylinder 1 makes a u-turn at an intermediate position. With such a configuration, a greater length may be secured for the cylinder 1, thereby enabling saccharization and fermentation within the cylinder 1 subsequent to the saccharization preparation zone 14, for example.

The invention claimed is:

1. A screw segment that is attachable to a screw shaft within a cylinder of a screw extruder so as to be rotatable therewith, the screw segment comprising:
    a shaft part that is to be affixed to the screw shaft; and
    a tooth part that protrudes radially outward from the shaft part, wherein
    the tooth part has a tooth surface formed on a front side relative to the rotation direction of the screw shaft, the tooth surface formed on the front side being sloped forward towards the rotation direction as it transitions radially outward from the shaft part, as viewed in cross-section, and
    the tooth surface is so formed that a tooth tip side of the tooth part is narrower than a tooth base side.

2. The screw segment according to claim 1, wherein the tooth surface is e sloped so as to transition rearward relative to the rotation direction as it transitions from an upstream side within the cylinder relative to a feeding direction towards a downstream side.

3. The screw segment according to claim 2, wherein the tooth part comprises:

a top surface that faces an inner wall surface of the cylinder;
a front surface formed on an upstream side of the tooth part relative to the feeding direction; and
a step part formed by cutting away an edge part between the top surface and the front surface to create a level difference.

4. The screw segment according to claim 1, wherein the tooth part comprises:
a top surface that faces an inner wall surface of the cylinder;
a front surface formed on an upstream side of the tooth part relative to the feeding direction; and
a step part formed by cutting away an edge part between the top surface and the front surface to create a level difference.

5. A screw extruder comprising:
a cylinder;
a screw shaft within the cylinder so as to be rotatable therewith;
a screw segment attached to the screw shaft, the screw segment including:
a shaft part that is to be affixed to the screw shaft; and
a tooth part that protrudes radially outward from the shaft part, wherein
the tooth part has a tooth surface formed on a front side relative to the rotation direction of the screw shaft, the tooth surface formed on the front side being sloped forward towards the rotation direction as it transitions radially outward from the shaft part, as viewed in cross-section and
the tooth surface is so formed that a tooth tip side of the tooth part is narrower than a tooth base side.

6. The screw extruder according to claim 5, wherein the tooth part comprises:
a top surface that faces an inner wall surface of the cylinder;
a front surface formed on an upstream side of the tooth part relative to the feeding direction; and
a step part formed by cutting away an edge part between the top surface and the front surface to create a level difference.

7. The screw extruder according to claim 5, wherein the tooth surface is so sloped as to transition rearward relative to the rotation direction as it transitions from an upstream side within the cylinder relative to a feeding direction towards a downstream side.

* * * * *